US011263142B1

(12) United States Patent
Fisher

(10) Patent No.: US 11,263,142 B1
(45) Date of Patent: Mar. 1, 2022

(54) SERVICING MEMORY HIGH PRIORITY READ REQUESTS

(71) Applicant: Micron Technology, Inc., Boise, ID (US)

(72) Inventor: Ryan G. Fisher, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 17/005,079

(22) Filed: Aug. 27, 2020

(51) Int. Cl.
*G06F 12/08* (2016.01)
*G06F 12/0882* (2016.01)
*G06F 12/0891* (2016.01)
*G06F 9/48* (2006.01)
*G06F 9/30* (2018.01)
*G06F 12/02* (2006.01)

(52) U.S. Cl.
CPC ...... *G06F 12/0882* (2013.01); *G06F 9/30047* (2013.01); *G06F 9/30101* (2013.01); *G06F 9/4881* (2013.01); *G06F 12/0246* (2013.01); *G06F 12/0891* (2013.01)

(58) Field of Classification Search
None
See application file for complete search history.

(56) References Cited

U.S. PATENT DOCUMENTS

| 2007/0242074 | A1* | 10/2007 | Stuttard | G06F 9/3004 345/505 |
|---|---|---|---|---|
| 2007/0245123 | A1* | 10/2007 | Stuttard | G06T 1/20 712/22 |
| 2007/0245130 | A1* | 10/2007 | Stuttard | G06F 9/3001 712/220 |
| 2007/0245132 | A1* | 10/2007 | Stuttard | G06T 1/20 712/225 |
| 2007/0294510 | A1* | 12/2007 | Stuttard | G06F 9/3838 712/22 |
| 2008/0007562 | A1* | 1/2008 | Stuttard | G06F 9/3838 345/581 |
| 2008/0008393 | A1* | 1/2008 | Stuttard | G06F 9/30087 382/234 |
| 2008/0016318 | A1* | 1/2008 | Stuttard | G06F 9/3001 712/20 |
| 2008/0028184 | A1* | 1/2008 | Stuttard | G06F 9/3836 712/22 |
| 2008/0034185 | A1* | 2/2008 | Stuttard | G06F 9/3887 712/22 |
| 2008/0034186 | A1* | 2/2008 | Stuttard | G06F 9/3004 712/22 |
| 2008/0052492 | A1* | 2/2008 | Stuttard | G06F 9/30087 712/22 |
| 2008/0098201 | A1* | 4/2008 | Stuttard | G06F 9/3887 712/22 |
| 2008/0162874 | A1* | 7/2008 | Stuttard | G06F 9/30087 712/22 |

* cited by examiner

*Primary Examiner* — Kevin Verbrugge
(74) *Attorney, Agent, or Firm* — Schwegman Lundberg & Woessner, P.A.

(57) ABSTRACT

Various embodiments described herein provide for a memory device that can service a high priority read request during data input without losing the data inputted to the memory device prior to the high priority read request, without re-requesting data from a host, and while leaving one or more internal resources of a memory sub-system available for use by an error correction function of the memory sub-system.

20 Claims, 19 Drawing Sheets

US 11,263,142 B1

SERVICING MEMORY HIGH PRIORITY READ REQUESTS

TECHNICAL FIELD

Embodiments of the disclosure relate generally to memory devices and, more specifically, to servicing high priority read requests on memory devices.

BACKGROUND

A memory sub-system can include one or more memory devices that store data. The memory devices can be, for example, non-volatile memory devices and volatile memory devices. In general, a host system can utilize a memory sub-system to store data at the memory devices and to retrieve data from the memory devices.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

DETAILED DESCRIPTION

Figure 1:
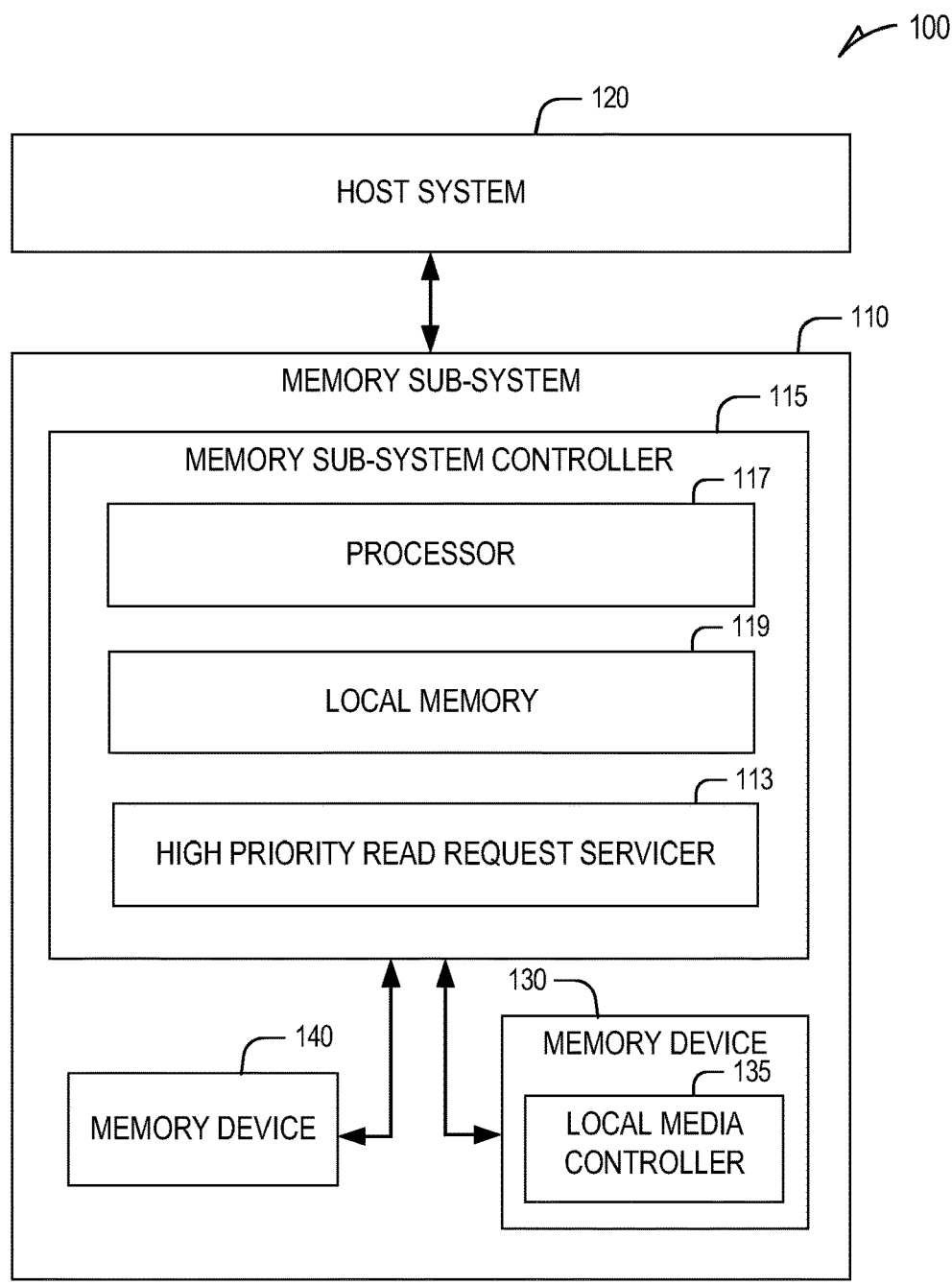
FIG. 1 is a block diagram illustrating an example computing system that includes a memory sub-system, in accordance with some embodiments of the present disclosure.

Aspects of the present disclosure are directed to servicing high priority read requests to read data from a memory device, such as the memory device of a memory sub-system. A memory sub-system can be a storage device, a memory module, or a hybrid of a storage device and memory module. Examples of storage devices and memory modules are described below in conjunction with FIG. 1. In general, a host system can utilize a memory sub-system that includes one or more components, such as memory devices that store data. The host system can send access requests to the memory sub-system, such as to store data at the memory sub-system and to read data from the memory sub-system.

The host system can send access requests (e.g., write command, read command,) to the memory sub-system, such as to store data on a memory device at the memory sub-system, read data from the memory device on the memory sub-system, or write/read constructs (e.g., such as submission and completion queues) with respect to a memory device on the memory sub-system. The data to be read or written, as specified by a host request, is hereinafter referred to as "host data." A host request can include logical address information (e.g., logical block address (LBA), namespace) for the host data, which is the location the host system associates with the host data. The logical address information (e.g., LBA, namespace) can be part of metadata for the host data. Metadata can also include error handling data (e.g., error-correcting code (ECC) codeword, parity code), data version (e.g. used to distinguish age of data written), valid bitmap (which LBAs or logical transfer units contain valid data), and so forth.

The memory sub-system can initiate media management operations, such as a write operation, on host data that is stored on a memory device. For example, firmware of the memory sub-system may re-write previously written host data from a location on a memory device to a new location as part of garbage collection management operations. The data that is re-written, for example as initiated by the firmware, is hereinafter referred to as "garbage collection data."

"User data" hereinafter generally refers to host data and garbage collection data. "System data" hereinafter refers to data that is created and/or maintained by the memory sub-system for performing operations in response to host requests and for media management. Examples of system data include, and are not limited to, system tables (e.g., logical-to-physical memory address mapping table (also referred to herein as a L2P table), data from logging, scratch pad data, and so forth.

A memory device can be a non-volatile memory device. A non-volatile memory device is a package of one or more die. Each die can be comprised of one or more planes. For some types of non-volatile memory devices (e.g., negative-and (NAND)-type devices), each plane is comprised of a set of physical blocks. For some memory devices, blocks are the smallest area than can be erased. Each block is comprised of a set of pages. Each page is comprised of a set of memory cells, which store bits of data. The memory devices can be raw memory devices (e.g., NAND), which are managed externally, for example, by an external controller. The memory devices can be managed memory devices (e.g., managed NAND), which are a raw memory device combined with a local embedded controller for memory management within the same memory device package.

Some traditional memory sub-systems support high priority read requests from a host system, which enable them to achieve high quality of service (QoS) metrics. As part of the servicing a high priority read request, traditional memory sub-systems apply error correction prior to outputting (to the host system) the data being requested by the high priority read request. However, to do so, some traditional memory sub-systems use conventional methodologies of servicing a high priority read request that limit the ability the use of all read functions and error recovery functions (that would otherwise be available to the traditional memory sub-systems) prior to outputting the data being requested by the high priority read request. For example, some traditional memory sub-systems use special memory commands (e.g., special commands from a memory sub-system controller to a NAND-type memory device of the memory sub-system) to temporarily move data inputted to one or more cache registers of a memory component (e.g., the NAND-type memory device) prior to programming to an array of the memory component (e.g., NAND array of the NAND-type memory device) to one or more other internal data registers of the memory component (e.g., secondary data caches (SDCs) or primary data caches (PDCs) of the NAND-type memory device). In doing so, functions (e.g., read and error recovery functions) that can be performed are limited/restricted to avoid certain functions from overwriting or corrupting the temporary data stored in those one or more other internal data registers. After those special memory commands are used to move the inputted data, traditional memory sub-systems enable only a subset of read operations (e.g., NAND read operations) and a subset of error recovery features/functions (e.g., NAND error recovery features) to service a high priority read request; the enabled subset of read operations and the enabled subset of error recovery features/functions are ones that ensure that the data moved from the one or more cache registers to the one or more other internal data registers is not lost. After the high priority read request is serviced, specialized memory commands are again used to move the data from the one or more other internal data registers back to the one or more cache registers, and the traditional memory sub-system can continue/resume (where it left off prior to servicing the high priority read request) with performing data input operations (e.g., NAND array programming).

Aspects of the present disclosure address the above and other deficiencies. Various embodiments described herein provide for a memory device (e.g., of a memory sub-system) that can service a high priority read request (e.g., from a host system) during data input without losing the data inputted to the memory device prior to the high priority read request, without re-requesting data from a host, and while leaving one or more internal resources of a memory sub-system available for use by an error correction function of the memory sub-system. For example, some embodiments use a NAND-type memory device's single level cell (SLC) program capability to service a high priority read request, which can allow the NAND-type memory device to avoid use of various internal register resources (e.g., SDCs or PDCs of the NAND-type memory device) while servicing the high priority read request. By avoiding use of the various internal register resources, some embodiments can cause the NAND-type memory device to use less time and overhead to execute operations, and can enable the NAND-type memory device to use all NAND read functions and NAND error recovery functions while servicing the high priority read request without risking overwrite of data previously inputted to the NAND-type memory device. Additionally, by using the SLC program capability of a NAND-type memory device to service high priority read requests, various embodiments can reduce the complexity of the NAND-type memory device, increase the reliability of the NAND-type memory device, and increase efficiency of the NAND-type memory device. For instance, given that a page of a SLC block can be written to (e.g., SLC programmed) more than once between erase operations (e.g., NOP feature of SLC programming), use of pages of a SLC block in accordance with various embodiments can result in one or more of: easier/more efficient use of a page in a SLC block (e.g., no unused bytes per page of a SLC block); reduced write amplification; simplified data organization; and faster garbage collection operations. Additionally, some embodiments can characterize and quantify use of SLC NAND NOP values, while taking into account a use model and correction capabilities of the memory device. Embodiments described herein can be implemented in a memory device or memory sub-system that either uses SLC NAND caching, SLC NAND caching is used to fold data to higher bit per cell final destinations, such as into final triple level cell (TLC) data locations) or does not use SLC NAND caching.

According to various embodiments, while a processing device, such as one of a memory sub-system controller or a media controller, is inputting a series of data units (e.g., data chunks or data sectors, such as 4 KB data sectors) to a cache register of a memory device to write that series of data units to the memory device, the processing device can use a page (e.g., 16 KB page) of a block (e.g., SLC block) of a memory device to store one or more data units currently stored on a cache register of the memory device when a high priority read request exists for the memory device to service. For example, some embodiments are implemented with respect to a memory device comprising a NAND-type memory device that has at least one NAND die, where: the at least one NAND die comprises a set of planes (e.g., organized as a logic unit (LUN)); each plane comprises a plurality of blocks (e.g., 512 blocks); each block comprises a plurality of pages; and for each plane, the at least one NAND die comprises a cache register (e.g., page register) for inputting and outputting data with respect to data stored within the plane (e.g., stored on a page of a block of a plane). With respect to this example, a processing device associated with the memory device (e.g., processing device of a memory sub-system controller or of a media controller) can be processing a write request to write input data to a particular plane of the NAND die by inputting (e.g., issuing) a series of data units of the input data to a particular cache register associated with the plane. While processing this write request, the processing device can determine that a high priority read request on a first page from the particular plane of the NAND die exists (e.g., high priority read request was generated or received by the processing device, such as based on a read request from a host system coupled to the processing device). In response to determining that the high priority read request exists, the processing device can: stop (e.g., interrupt or pause) processing of the write request using the cache register; generate log data that describes an occurrence of the high priority read request (e.g., high priority read request event) and describes where processing of the write request stopped; cause prior-inputted data content currently stored on the cache register to be stored on a second page of the particular plane (different from the first page); cause requested data content of the first page to be read into the cache register; read, from the cache register, the requested data content of the first page; clear the cache register; and based on the log data, resume processing the write request (using the cache register) from where the processing stopped (e.g., where the processing left off).

For some embodiments, the second page is part of a SLC block of the particular plane, and the data content is stored to the second page using SLC programming of the second page. Additionally, for some embodiments, how the processing of the write request resumes can depend on whether or not the memory device is using SLC caching. Where the memory device is not using SLC caching, the SLC block can be one that is reserved for use for temporarily storing data from the cache register in accordance with various embodiments described herein.

As used herein, a block of a NAND-type memory device can be implemented using different types of memory cells, which are each written to programming based on the memory cell type. For instance, a block can comprise a SLC block that is implemented by one or more SLCs, and a page of the SLC block can be written to by using SLC programming. In another instance, a block can comprise a TLC that is implemented by one or more TLCs, and a page of the TLC block can be written to by using a TLC programming.

Disclosed herein are some examples of servicing higher priority read requests on a memory device, as described herein.

FIG. 1 illustrates an example computing system 100 that includes a memory sub-system 110, in accordance with some embodiments of the present disclosure. The memory sub-system 110 can include media, such as one or more volatile memory devices (e.g., memory device 140), one or more non-volatile memory devices (e.g., memory device 130), or a combination of such.

A memory sub-system 110 can be a storage device, a memory module, or a hybrid of a storage device and memory module. Examples of a storage device include a solid-state drive (SSD), a flash drive, a universal serial bus (USB) flash drive, a secure digital (SD) card, an embedded Multi-Media Controller (eMMC) drive, a Universal Flash Storage (UFS) drive, and a hard disk drive (HDD). Examples of memory modules include a dual in-line memory module (DIMM), a small outline DIMM (SO-DIMM), and various types of non-volatile dual in-line memory module (NVDIMM).

The computing system 100 can be a computing device such as a desktop computer, laptop computer, network server, mobile device, a vehicle (e.g., airplane, drone, train, automobile, or other conveyance), Internet of Things (IoT) enabled device, embedded computer (e.g., one included in a vehicle, industrial equipment, or a networked commercial device), or such computing device that includes memory and a processing device.

The computing system 100 can include a host system 120 that is coupled to one or more memory sub-systems 110. In some embodiments, the host system 120 is coupled to different types of memory sub-systems 110. FIG. 1 illustrates one example of a host system 120 coupled to one memory sub-system 110. As used herein, "coupled to" or "coupled with" generally refers to a connection between components, which can be an indirect communicative connection or direct communicative connection (e.g., without intervening components), whether wired or wireless, including connections such as electrical, optical, magnetic, and the like.

The host system 120 can include a processor chipset and a software stack executed by the processor chipset. The processor chipset can include one or more cores, one or more caches, a memory controller (e.g., NVDIMM controller), and a storage protocol controller (e.g., a peripheral component interconnect express (PCIe) controller, serial advanced technology attachment (SATA) controller). The host system 120 uses the memory sub-system 110, for example, to write data to the memory sub-system 110 and read data from the memory sub-system 110.

The host system 120 can be coupled to the memory sub-system 110 via a physical host interface. Examples of a physical host interface include, but are not limited to, a SATA interface, a peripheral component interconnect express (PCIe) interface, universal serial bus (USB) interface, Fibre Channel, Serial Attached SCSI (SAS), Small Computer System Interface (SCSI), a double data rate (DDR) memory bus, a dual in-line memory module (DIMM) interface (e.g., DIMM socket interface that supports Double Data Rate (DDR)), Open NAND Flash Interface (ONFI), Double Data Rate (DDR), Low Power Double Data Rate (LPDDR), or any other interface. The physical host interface can be used to transmit data between the host system 120 and the memory sub-system 110. The host system 120 can further utilize an NVM Express (NVMe) interface to access components (e.g., memory devices 130) when the memory sub-system 110 is coupled with the host system 120 by the PCIe interface. The physical host interface can provide an interface for passing control, address, data, and other signals between the memory sub-system 110 and the host system 120. FIG. 1 illustrates a memory sub-system 110 as an example. In general, the host system 120 can access multiple memory sub-systems via a same communication connection, multiple separate communication connections, and/or a combination of communication connections.

The memory devices 130,140 can include any combination of the different types of non-volatile memory devices and/or volatile memory devices. The volatile memory devices (e.g., memory device 140) can be, but are not limited to, random access memory (RAM), such as dynamic random access memory (DRAM) and synchronous dynamic random access memory (SDRAM).

Some examples of non-volatile memory devices (e.g., memory device 130) include a negative-and (NAND) type flash memory and write-in-place memory, such as a three-dimensional cross-point ("3D cross-point") memory device, which is a cross-point array of non-volatile memory cells. A cross-point array of non-volatile memory can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. NAND type flash memory includes, for example, two-dimensional NAND (2D NAND) and three-dimensional NAND (3D NAND).

Each of the memory devices 130 can include one or more arrays of memory cells. One type of memory cell, for example, SLCs, can store one bit per cell. Other types of memory cells, such as multi-level cells (MLCs), TLCs, quad-level cells (QLCs), and penta-level cells (PLCs), can store multiple bits per cell. In some embodiments, each of the memory devices 130 can include one or more arrays of memory cells such as SLCs, MLCs, TLCs, QLCs, or any combination of such. In some embodiments, a particular memory device can include an SLC portion, and an MLC portion, a TLC portion, or a QLC portion of memory cells. The memory cells of the memory devices 130 can be grouped as pages that can refer to a logical unit of the memory device used to store data. With some types of memory (e.g., NAND), pages can be grouped to form blocks.

Although non-volatile memory components such as NAND type flash memory (e.g., 2D NAND, 3D NAND) and 3D cross-point array of non-volatile memory cells are described, the memory device 130 can be based on any other type of non-volatile memory, such as read-only memory (ROM), phase change memory (PCM), self-selecting memory, other chalcogenide based memories, ferroelectric transistor random-access memory (FeTRAM), ferroelectric random access memory (FeRAM), magneto random access memory (MRAM), Spin Transfer Torque (STT)-MRAM, conductive bridging RAM (CBRAM), resistive random access memory (RRAM), oxide based RRAM (OxRAM), negative-or (NOR) flash memory, and electrically erasable programmable read-only memory (EEPROM).

A memory sub-system controller 115 (or controller 115 for simplicity) can communicate with the memory devices 130 to perform operations such as reading data, writing data, or erasing data at the memory devices 130 and other such operations. The memory sub-system controller 115 can include hardware such as one or more integrated circuits and/or discrete components, a buffer memory, or a combination thereof. The hardware can include digital circuitry with dedicated (i.e., hard-coded) logic to perform the operations described herein. The memory sub-system controller 115 can be a microcontroller, special purpose logic circuitry (e.g., a field programmable gate array (FPGA), an application specific integrated circuit (ASIC), etc.), or other suitable processor.

The memory sub-system controller 115 can include a processor (processing device) 117 configured to execute instructions stored in local memory 119. In the illustrated example, the local memory 119 of the memory sub-system controller 115 includes an embedded memory configured to store instructions for performing various processes, operations, logic flows, and routines that control operation of the memory sub-system 110, including handling communications between the memory sub-system 110 and the host system 120.

In some embodiments, the local memory 119 can include memory registers storing memory pointers, fetched data, and so forth. The local memory 119 can also include read-only memory (ROM) for storing micro-code. While the example memory sub-system 110 in FIG. 1 has been illustrated as including the memory sub-system controller 115, in another embodiment of the present disclosure, a memory sub-system 110 does not include a memory sub-system controller 115, and can instead rely upon external control (e.g., provided by an external host, or by a processor or controller separate from the memory sub-system).

In general, the memory sub-system controller 115 can receive commands or operations from the host system 120 and can convert the commands or operations into instructions or appropriate commands to achieve the desired access to the memory devices 130 and/or the memory device 140. The memory sub-system controller 115 can be responsible for other operations such as wear leveling operations, garbage collection operations, error detection and error-correcting code (ECC) operations, encryption operations, caching operations, and address translations between a logical address (e.g., logical block address (LBA), namespace) and a physical memory address (e.g., physical block address) that are associated with the memory devices 130. The memory sub-system controller 115 can further include host interface circuitry to communicate with the host system 120 via the physical host interface. The host interface circuitry can convert the commands received from the host system 120 into command instructions to access the memory devices 130 and/or the memory device 140 as well as convert responses associated with the memory devices 130 and/or the memory device 140 into information for the host system 120.

The memory sub-system 110 can also include additional circuitry or components that are not illustrated. In some embodiments, the memory sub-system 110 can include a cache or buffer (e.g., DRAM) and address circuitry (e.g., a row decoder and a column decoder) that can receive an address from the memory sub-system controller 115 and decode the address to access the memory devices 130.

In some embodiments, the memory devices 130 include local media controllers 135 that operate in conjunction with memory sub-system controller 115 to execute operations on one or more memory cells of the memory devices 130. An external controller (e.g., memory sub-system controller 115) can externally manage the memory device 130 (e.g., perform media management operations on the memory device 130). In some embodiments, a memory device 130 is a managed memory device, which is a raw memory device combined with a local controller (e.g., local media controller 135) for media management within the same memory device package. An example of a managed memory device is a managed NAND (MNAND) device.

The memory sub-system controller 115 includes a high priority read request servicer 113 that enables or facilitates servicing a high priority read request by a memory device of the memory sub-system 110 (e.g., 130 or 140) as described herein. For example, based on the high priority read request servicer 113, the memory sub-system controller 115 can generate one or more write requests for the memory device 130. The one or more write requests can be generated, for example, in response to receiving a write request from the host system 120, where the one or more write requests can facilitate execution of the write request from the host system 120 on the memory sub-system 110. At least one generated write request for the memory device 130 can be associated with (e.g., addressed to) a particular plane of the memory device 130. To execute the at least one generated write request, the memory sub-system controller 115 can issue a series of data units (e.g., data chunks or data sectors) to a particular cache register (e.g., page register) of the memory device 130 that is associated with the particular plane. The particular cache register can receive the series of data units as input data. While issuing the series of data units to the particular cache register, the memory sub-system controller 115 can determine (e.g., based on periodic determination or detection) that a high priority read request for data from a first page of a particular block of the particular plane currently exists. For instance, the memory sub-system controller 115 can determine that the high priority read request exists after the high priority read request is received from the host system 120, or after the memory sub-system controller 115 generates the high priority read request based on a request sent from the host system 120 (e.g., the host system 120 sent the memory sub-system 110 a read request with high priority). In response to determining the high priority read request, the memory sub-system controller 115 can: stop (e.g., interrupt or pause) issuing the series of data units to the cache register; generate log data that describes an occurrence of the high priority read request and describes where issuing of the series of data units stopped; cause prior-inputted data content currently stored on the cache register to be stored on a second page of the particular plane (different from the first page); cause requested data content of the first page to be read into the cache register; read, from the cache register, the requested data content of the first page; clear the cache register; and based on the log data, resume issuing the series of data units to the cache register from where the issuing stopped (e.g., where the issuing left off). Depending on the embodiment, where the issuing of the series of data units stopped can determine an offset location in the cache register where the remaining data units that resume issuance (from the memory sub-system controller 115) begin placement.

Figure 7:
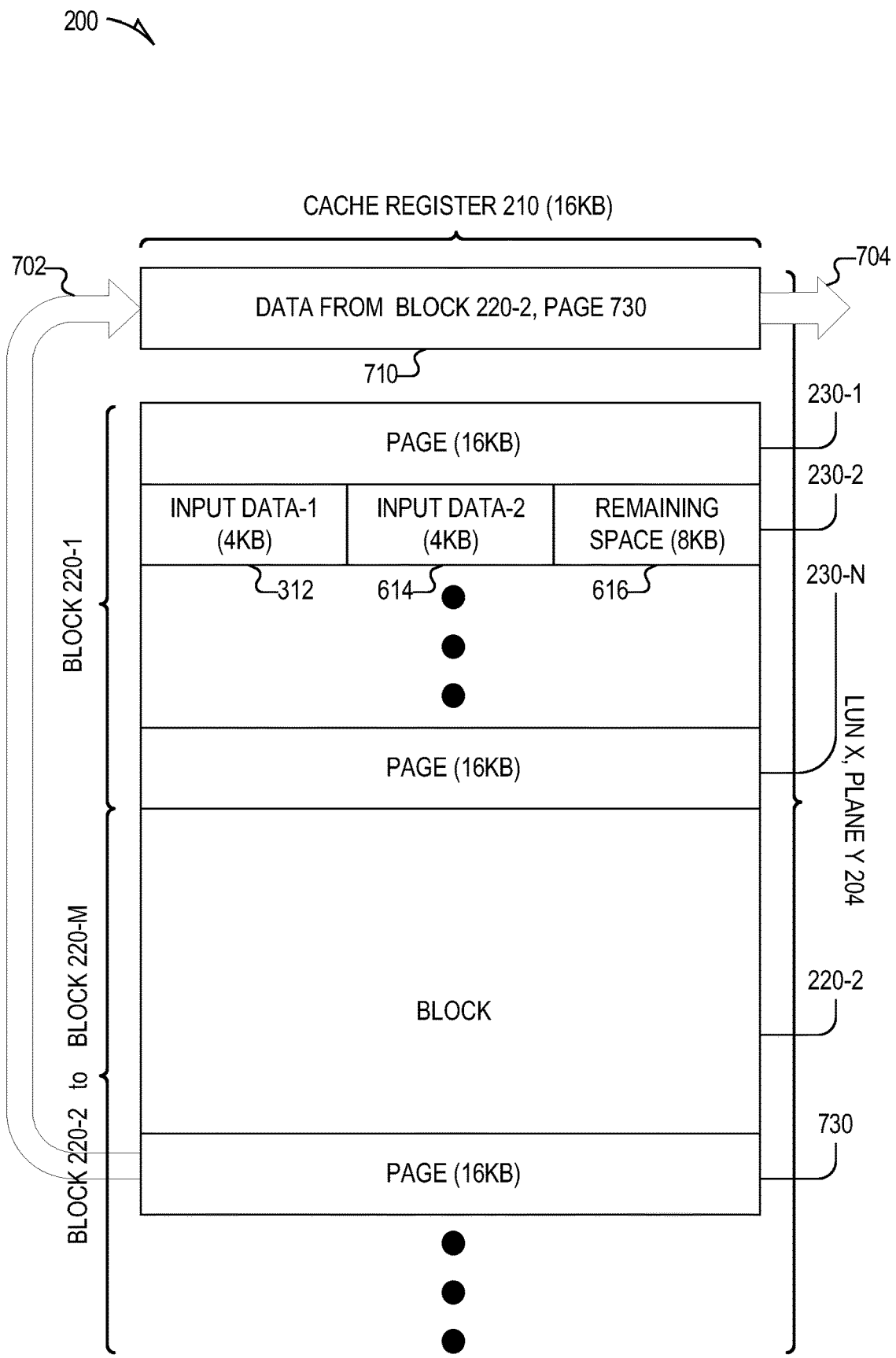
Figure 8:
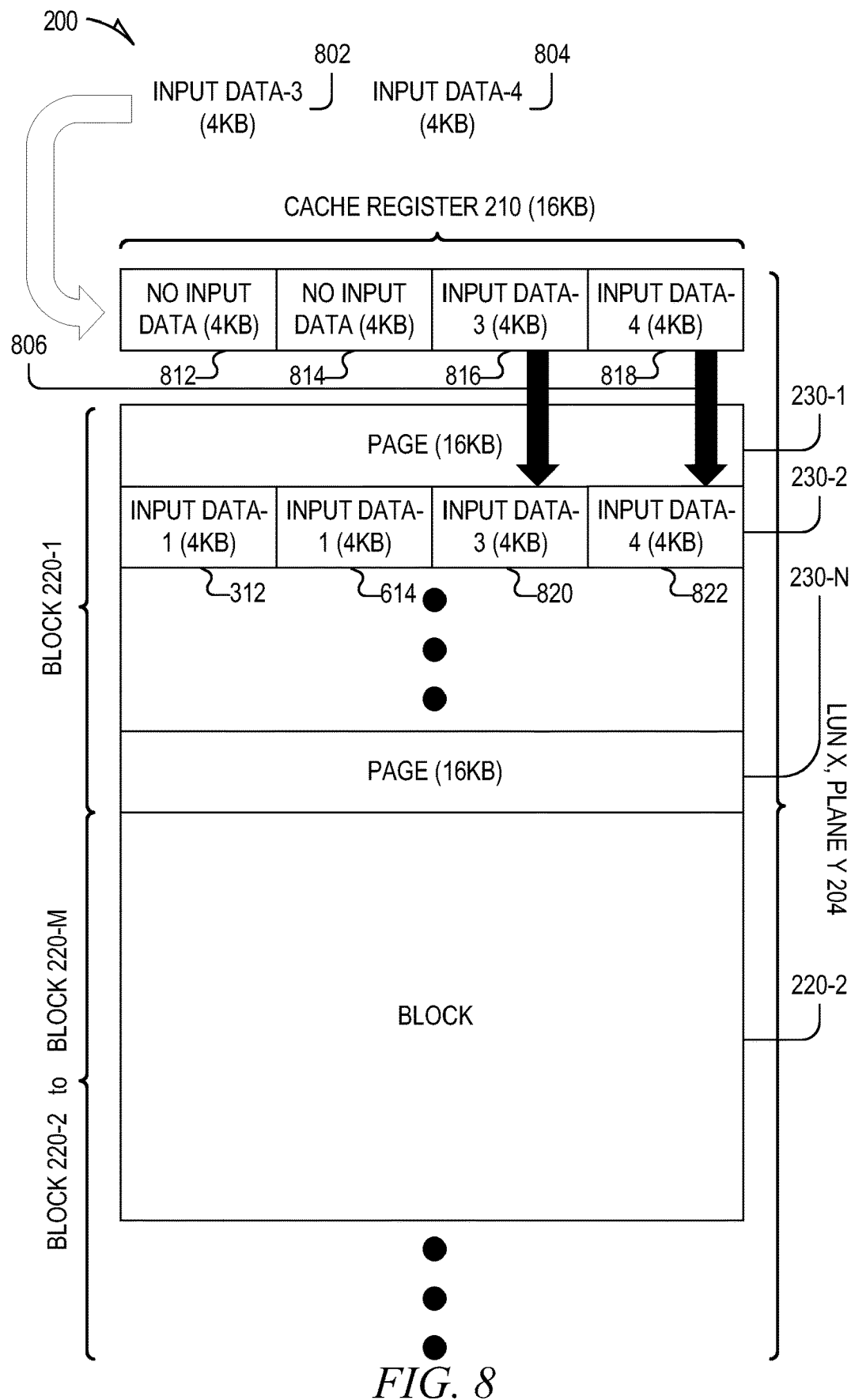
Figure 9:
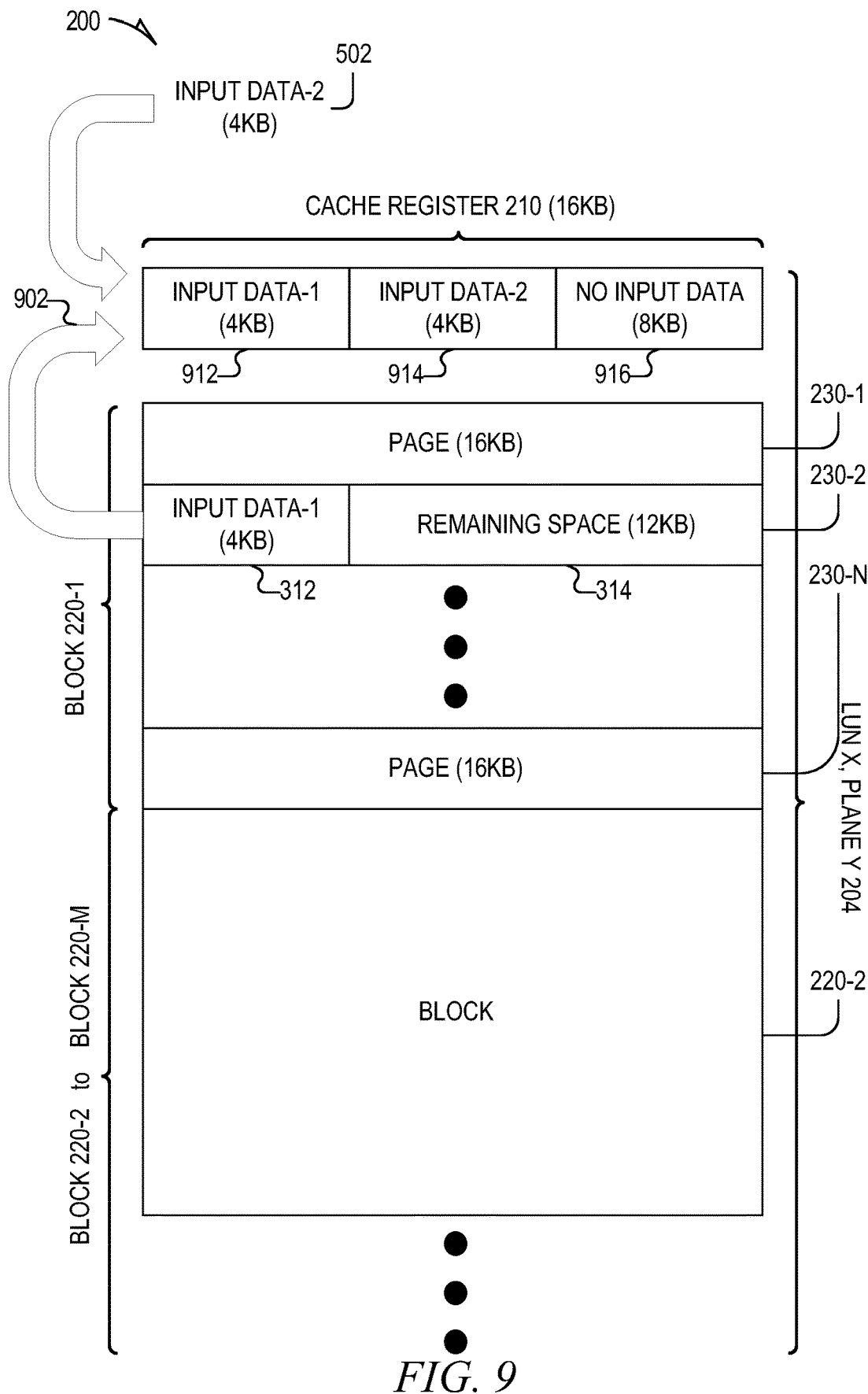
Figure 10:
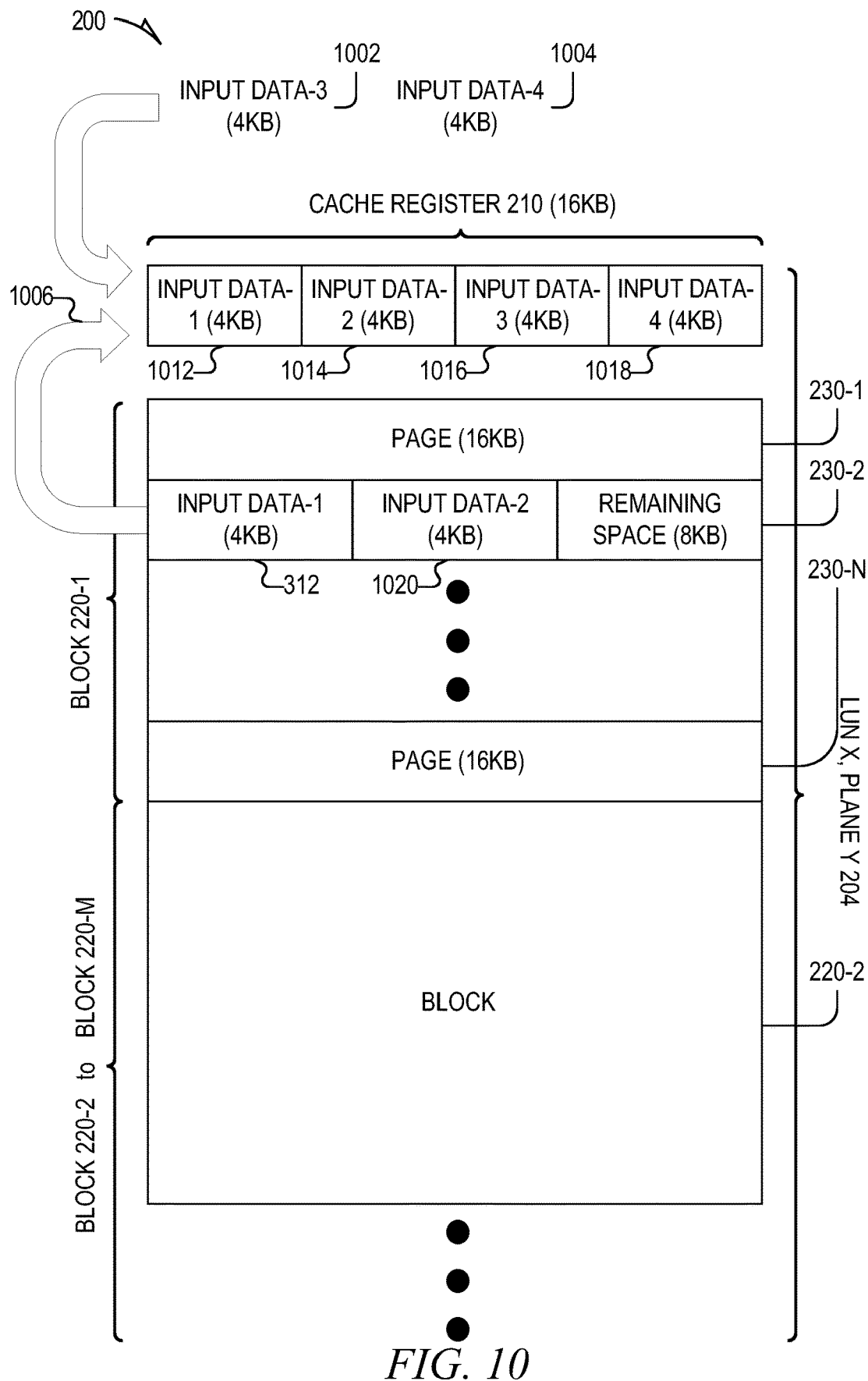
Figure 11:
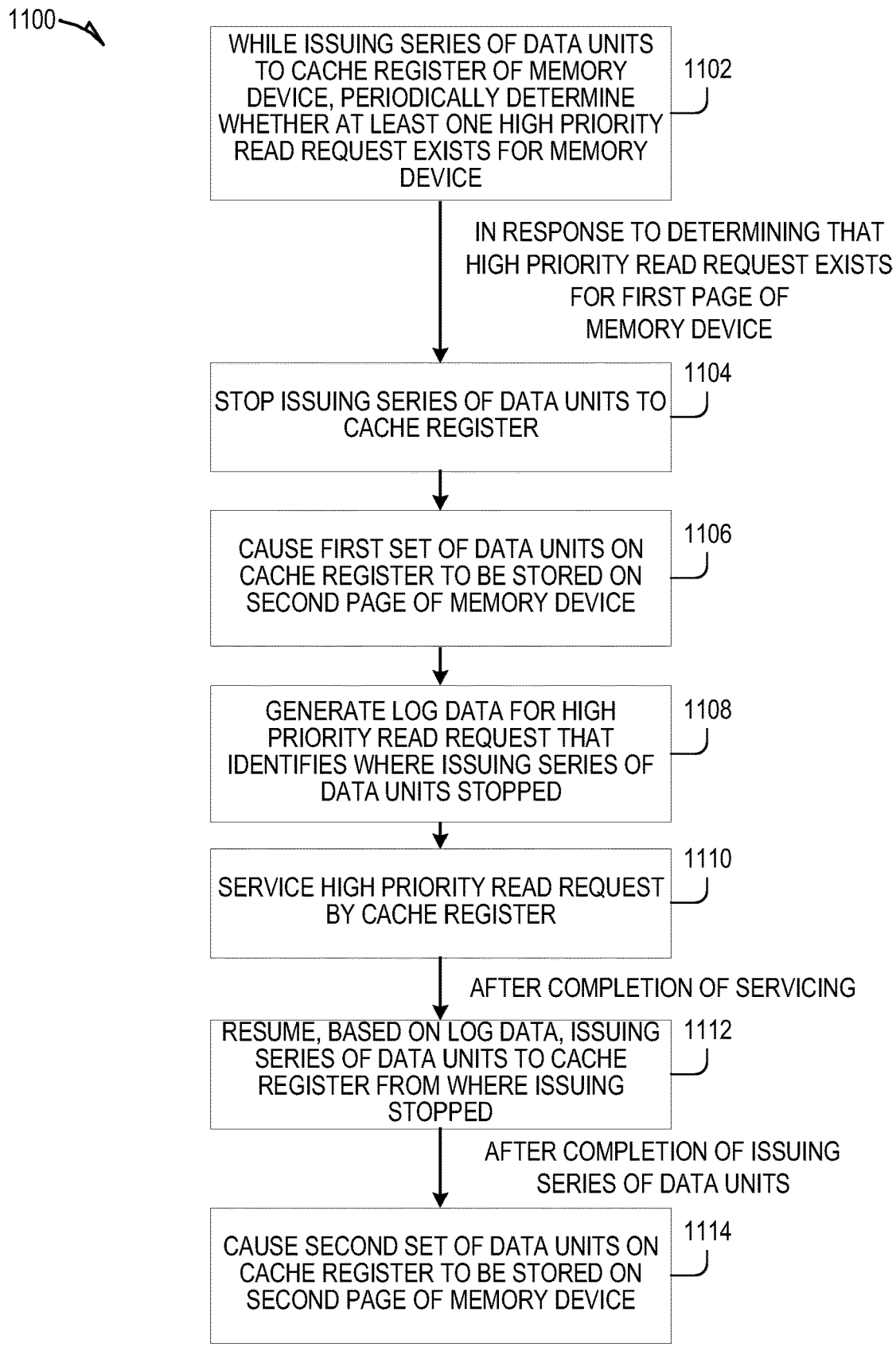
FIGS. 11 through 14 are flow diagrams of example methods for servicing a high priority read request by a memory device, in accordance with some embodiments of the present disclosure.

FIGS. 2 through 11 are block diagrams illustrating examples of servicing a high priority read request by a memory device 200, in accordance with some embodiments of the present disclosure. In particular, FIGS. 2 through 8 are block diagrams illustrating example operations performed when servicing a high priority read request by the memory device 200 when the memory device 200 is operating with SLC caching. FIGS. 9 through 11 are block diagrams illustrating example operations performed when servicing a high priority read request by the memory device 200 when the memory device is operating without SLC caching (e.g., TLC programming is default mode for writing data to the memory device). For some embodiments, the memory device 200 represents a memory device of a memory sub-system (e.g., 110), such as one of memory devices 130 or 140.

In FIGS. 2 through 11, the memory device 200 comprises a plane Y (hereafter, plane 204) of logic unit (LUN) X. For some embodiments, the memory device 200 comprises a plurality of planes that includes the plane 204, and the plurality of planes is organized into one or more LUNs that includes LUN X. Additionally, for some embodiments, the plane 204 forms part of a NAND die of the memory device 200. As shown, the memory device 200 comprises a cache register 210 that is specifically associated with the plane 204. Depending on the embodiment, the cache register 210 can comprise a page register of the memory device 200, where the page register has sufficient storage space to store a full page of data from a block of the plane 204. For some embodiments, the cache register 210 is used (e.g., by the memory sub-system controller 115) to write data (input data) to a page of the plane 204 and to read data (output data) from a page of the plane 204. As also shown, the plane 204 comprises multiple blocks 220-1 through 220-M (collectively referred to as blocks 220), and the block 220-1 comprises multiple pages 230-1 through 230-N (collectively referred to as pages 230). For illustrative purposes, each input data in FIGS. 2 through 11 represents a data unit (e.g., data sector or data chunk) that has been issued (e.g., sent or inputted to) the cache register 210 for eventual writing to a page of the plane 204; each of the pages 230 has a size of 16 KB; the cache register has a size of 16 KB (e.g., can store up to four 4 KB data units); and each input data has a size of 4 KB. The sizes of pages, blocks, and cache registers can vary between different embodiments.

Figure 2:
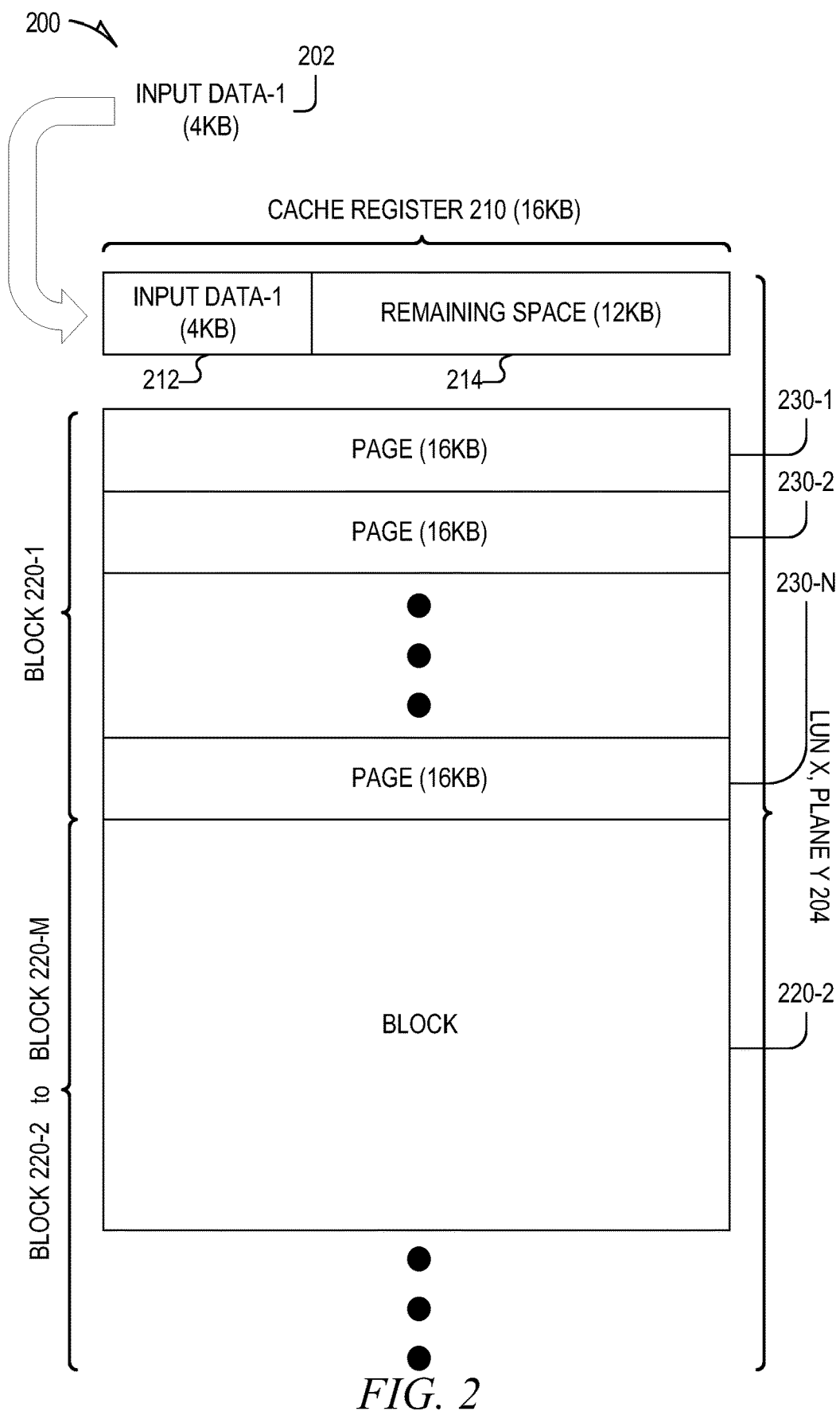
FIGS. 2 through 10 are block diagrams illustrating examples of servicing a high priority read request by a memory device, in accordance with some embodiments of the present disclosure.

Referring now to FIG. 2, prior to receiving a high priority read request being sent to the memory device 200, input data-1 (202) is issued (e.g., sent or inputted) to the cache register 210 sent from a processing device (e.g., the processor 117 of the memory sub-system controller 115). The input data-1 (202) can be part of a series of input data that is being sent to the memory device 200. The cache register 210 stores the input data-1 (202) at a location 212 in the cache register 210, thereby leaving 12 KB of remaining space 214 on the cache register 210.

Figure 3:
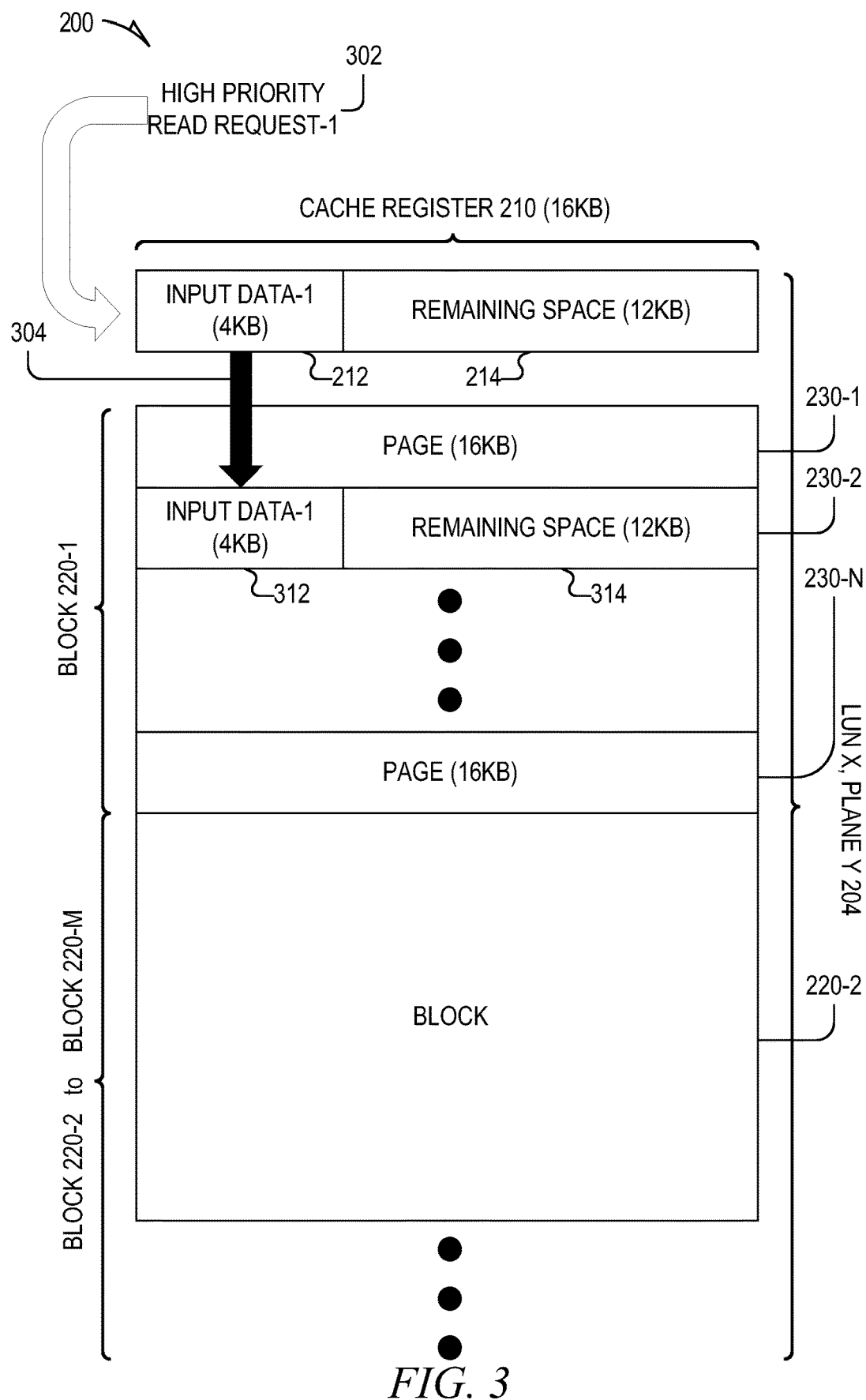

Referring now to FIG. 3, a high priority read request-1 (302) is sent (e.g., issued) to the memory device 200 from the processing device (e.g., the processor 117), where the high priority read request-1 (302) is requesting data from a page of a block (220-2) of the plane 204. Based on the high priority read request-1 (302), the processing device causes (e.g., by issuing a request to) the memory device 200 to store the input data-1 (202) on the page 230-2 (of the block 220-1) by operation 304. In doing so, input data previously inputted to the cache register is stored to the page 230-2. Depending on the embodiment, input data stored on a page can include other associated data for the input data, such as ECC data. For some embodiments, operation 304 comprises programming (e.g., SLC programming) the page 230-2 with the input data-1 (202). As a result, the input data-1 (202) is stored at location 312 in the page 230-2, thereby leaving 12 KB of remaining space 314 on the page 230-2 that is not programmed by operation 304 (e.g., remain in erase state). According to some embodiments, if the processing device determines that operation 304 fails with respect to the page 230-2, the processing device can attempt to store the input data-1 (202) to another page of the plane 204 (e.g., another page of another block of the plane 204).

Though not shown, according to various embodiments, the processing device stops issuing (e.g., sending or inputting) more input data until the high priority read request-1 (302) has been serviced. Additionally, the processing device can log the event of the high priority read request-1 (302), which can serve as identifying the location of the page 230-2 for later reference when resuming issuance of one or more input data to the cache register.

Figure 4:
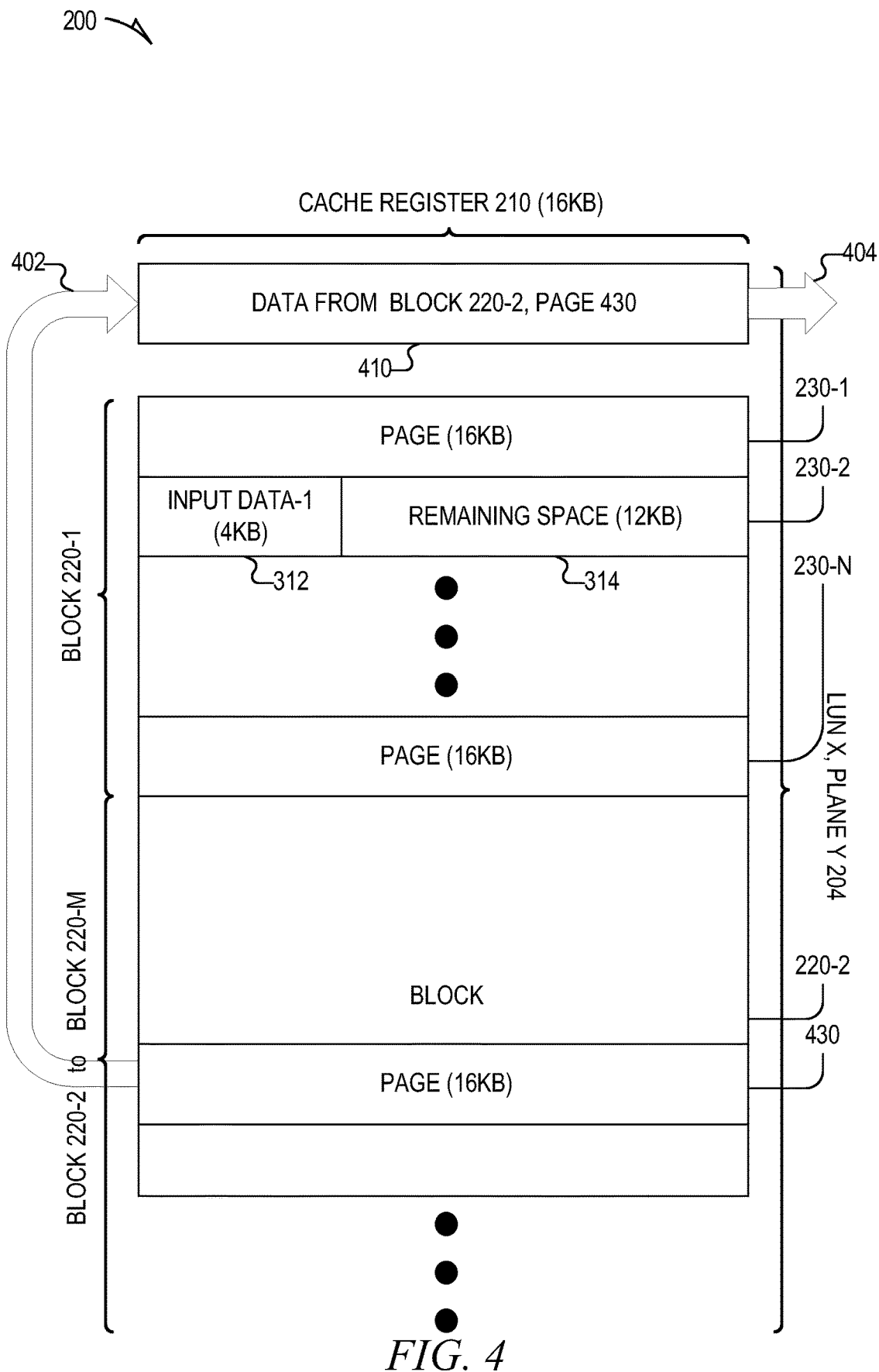

Referring now to FIG. 4, the processing device (e.g., the processor 117) causes the high priority read request-1 (302) (requesting data from the page 430 of the block 220-2 of the plane 204) to be serviced by the memory device 200. For various embodiments, the high priority read request-1 (302) can be serviced with the ability to use all (or nearly all) read operations and error correction functions of the memory device 200 (e.g., NAND read operations and error correction functions, such as cache read, corrective read, auto read calibration, soft data, read offset, and the like). Use of various embodiments as described herein (to service the high priority read request-1 (302)) can avoid use of one or more internal resources (e.g., register resources) that are used by those read operations and error correction functions. In particular, the processing device causes (e.g., by issuing a request to) the memory device 200 to read data 410 from the page 430 to the cache register 210. For example, the processing device can issue a read request to the page 430. At operation 402, the data 410 is read from the page 430 to the cache register 210. Subsequently, the processing device can read the data 410 out of the cache register 210 at operation 404, which facilitates the completion of the high priority read request-1 (302).

Figure 5:
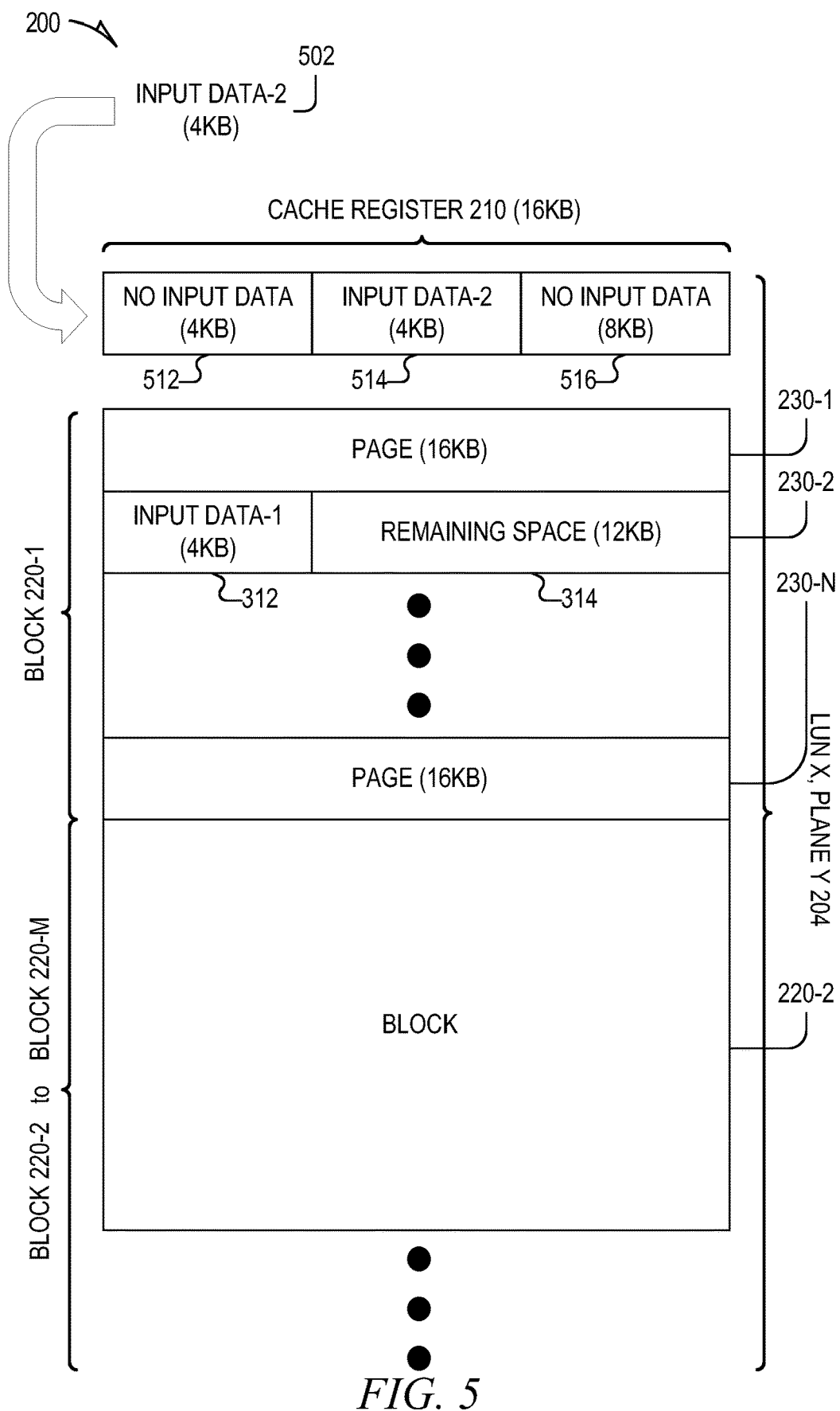

Referring now to FIG. 5, after the high priority read request-1 (302) has been serviced, the processing device (e.g., the processor 117) resumes (e.g., continues) issuing one or more input data (from the series of input data) to the cache register 210, starting with input data-2 (502). Prior to resuming the issuing, the processing device can clear the cache register 210. Based on referencing the log data previously generated, the processing device can determine where the issuing of input data stopped (e.g., interrupted or paused), and knows where new input data will be stored on the cache register 210 to avoid altering or overwriting previously issued input data (e.g., input data-1 (202)). Accordingly, based on the log data and the input data-1 (202) already being stored on the page 230-2 (at location 312), the processing device causes the input data-2 (502) to be stored at a location 514 (e.g., offset byte location 4096) in the cache register 210. In doing so, the processing device leaves no input data stored at location 512 of the cache register 210 and no input data stored at location 516 of the cache register 210.

Figure 6:
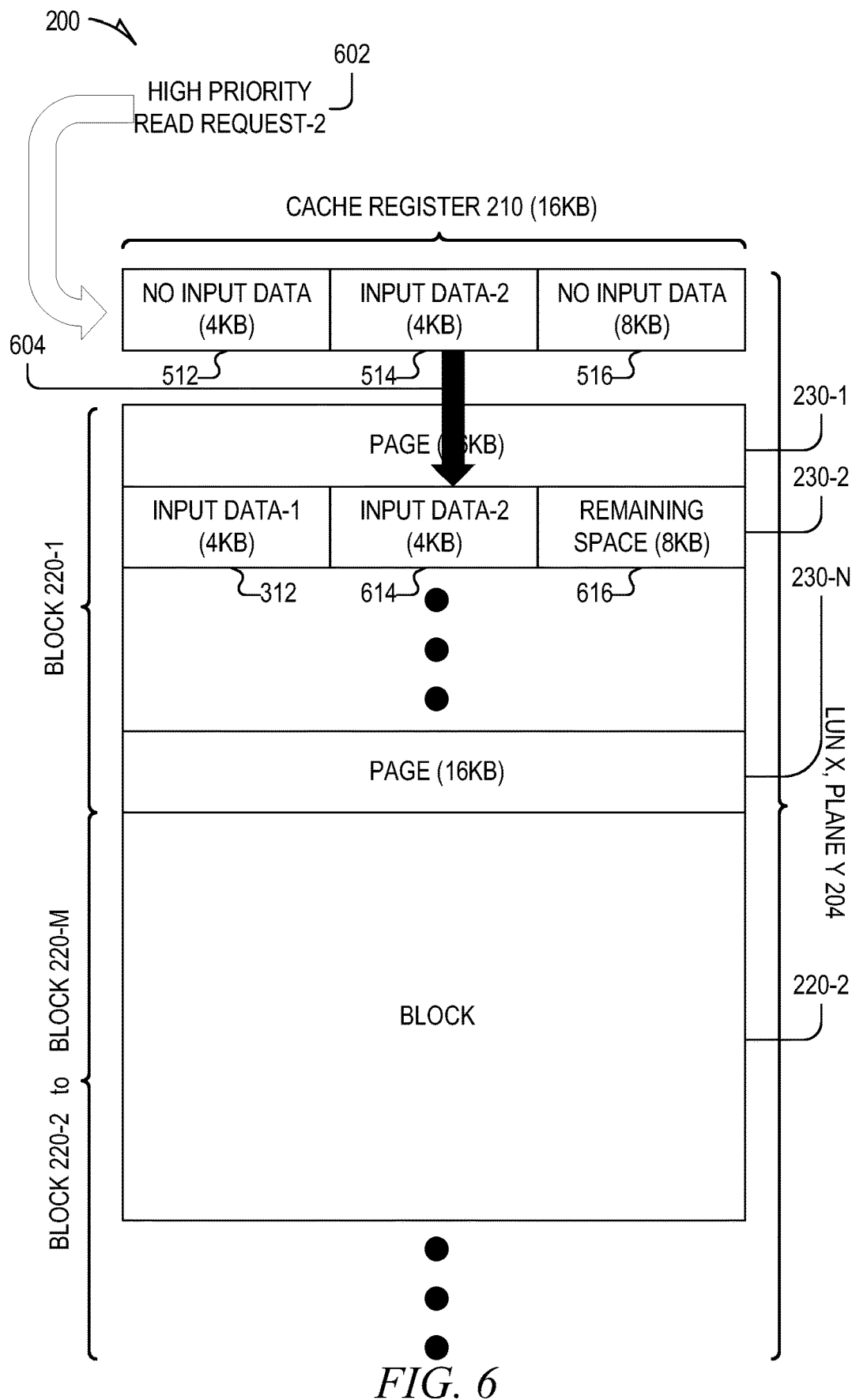

Referring now to FIG. 6, a high priority read request-2 (602) is sent (e.g., issued) to the memory device 200 from the processing device (e.g., the processor 117), where the high priority read request-2 (602) is requesting data from a page of a block (220-2) of the plane 204. Based on the high priority read request-2 (602), the processing device causes (e.g., by issuing a request to) the memory device 200 to store the input data-2 (502) on the page 230-2 (of the block 220-1) at a location 614 on the page 230-2 by operation 604. For some embodiments, operation 604 comprises programming (e.g., SLC programming) the page 230-2 with the input data-2 (202). Based on the cache register 210 containing no input data at location 512 and at location 516 in the cache register 210, the programming of the page 230-2 with data content of the cache register 210 can avoid altering or overwriting input data already stored on the page 230-2

(e.g., input data-1 stored at location 312). As a result, the input data-2 (502) is stored at location 614 (e.g., at bytes 4096 to 8191) in the page 230-2, thereby leaving 8 KB of remaining space 616 on the page 230-2 that is not programmed by operation 604 (e.g., remain in erase state). According to some embodiments, if the processing device determines that operation 604 fails with respect to the page 230-2, the processing device can attempt to store the input data-2 (502) to another page of the plane 204 (e.g., another page of another block of the plane 204).

Though not shown, according to various embodiments, the processing device stops issuing (e.g., sending or inputting) more input data until the high priority read request-2 (602) has been serviced. Additionally, the processing device can log the event of the high priority read request-2 (602), which can serve as identifying the location of the page 230-2 for later reference when resuming issuance of one or more input data to the cache register.

Referring now to FIG. 7, the processing device (e.g., the processor 117) causes the high priority read request-2 (602) (requesting data from the page 730 of the block 220-2 of the plane 204) to be serviced by the memory device 200. For various embodiments, the high priority read request-2 (602) can be serviced with the ability to use all (or nearly all) read operations and error correction functions of the memory device 200. As noted herein, use of various embodiments as described herein (to service the high priority read request-2 (602)) can avoid use of one or more internal resources (e.g., register resources) that are used by those read operations and error correction functions. In particular, the processing device causes (e.g., by issuing a request to) the memory device 200 to read data 710 from the page 730 to the cache register 210. For example, the processing device can issue a read request to the page 730. At operation 702, the data 710 is read from the page 730 to the cache register 210. Subsequently, the processing device can read the data 710 out of the cache register 210 at operation 704, which facilitates the completion of the high priority read request-2 (602).

Referring now to FIG. 8, after the high priority read request-2 (602) has been serviced, the processing device (e.g., the processor 117) resumes (e.g., continues) issuing one or more input data (from the series of input data) to the cache register 210, starting with input data-3 (802). Prior to resuming the issuing, the processing device can clear the cache register 210. Based on referencing the log data previously generated, the processing device can determine where the issuing of input data stopped (e.g., interrupted or paused), and knows where new input data will be stored on the cache register 210 to avoid altering or overwriting previously issued input data (e.g., input data-1 (202) and input data-2 (502)). Accordingly, based on the log data and based on the input data-1 (202) and the input data-2 (502) already being stored on the page 230-2 (at locations 312 and 614 respectively), the processing device causes the input data-3 (802) to be stored at a location 816 (e.g., location at offset byte 8191) in the cache register 210 and, thereafter, the input data-4 (804) to be stored at a location 818 in the cache register 210. In doing so, the processing device leaves no input data stored at locations 812 and 814 of the cache register 210.

Where the input data-3 (802) and the input data-4 (804) represents the end of input data being issued (e.g., sent or inputted) by the processing device, the processing device causes (e.g., by issuing a request to) the memory device 200 to store the input data-3 (802) and the input data-4 (804) to the page 230-2 at locations 820 and 822 on the page 230-2 by operation 806.

Referring now to FIG. 9, the example operations illustrated in FIG. 9 represent an alternative to the example of operations illustrated by FIG. 5. In FIG. 9, the illustrated operations are performed by the memory device 200 when servicing a high priority read request by the memory device 200 when the memory device 200 is operating without SLC caching (e.g., the method device 200 directly programs in a default mode supported by the device, such as using TLC programming).

In particular, after the high priority read request-1 (302) has been serviced, the processing device (e.g., the processor 117) resumes (e.g., continues) issuing one or more input data (from the series of input data) to the cache register 210, starting with input data-2 (502). Prior to resuming the issuing, the processing device can clear the cache register 210. Subsequently, based on referencing the log data previously generated, the processing device can determine that input data was previously stored on the page 230-2 and cause the previously stored input data to be read from the page 230-2 to the cache register 210. Accordingly, the processing device determines that the input data-1 (202) is already stored on the page 230-2, and causes (e.g., by issuing a request to) the memory device 200 to read the input data-1 (202) from location 312 on the page 230-2 to location 912 on the cache register 210. At operation 902, the input data-1 (202) is read from the page 230-2 to the cache register 210.

Thereafter, based on referencing the log data previously generated, the processing device can determine where the issuing of input data stopped (e.g., interrupted or paused), and knows where new input data will be stored on the cache register 210 to avoid altering or overwriting previously issued input data (e.g., the input data-1 (202)). Accordingly, based on the log data and the input data-1 (202) already being stored on the cache register 210 (at location 912), the processing device causes the input data-2 (502) to be stored at a location 914 (e.g., offset byte location 4096) in the cache register 210. In doing so, the processing device leaves no input data stored at location 916 of the cache register 210.

By reading previously stored input data into the cache register 210 and then resuming issuing remaining input data to the cache register 210, after the issuing has completed, the processing device can cause the data content of the cache register 210 to be written to a final destination page, where the final destination page comprises a page different from the page used to (temporarily) store input data while servicing a high priority read request. This can be useful where, for example, the memory device 200 is configured to operate without SLC caching; the page used to store input data while servicing a high priority read request is part of a SLC block (e.g., one reserved for temporarily store input data as described herein); and the final destination page is a non-SLC block.

Referring now to FIG. 10, the example operations illustrated in FIG. 10 represent an alternative to the example of operations illustrated by FIG. 8. In FIG. 8, the illustrated operations are performed by the memory device 200 when servicing a high priority read request by the memory device 200 when the memory device 200 is operating without SLC caching (e.g., the method device 200 directly programs in a default mode supported by the device, such as using TLC programming).

In particular, after the high priority read request-2 (602) has been serviced, the processing device (e.g., the processor 117) resumes (e.g., continues) issuing one or more input data (from the series of input data) to the cache register 210, starting with input data-3 (1002). Prior to resuming the issuing, the processing device can clear the cache register 210. Subsequently, based on referencing the log data previously generated, the processing device can determine that input data was previously stored on the page 230-2 and cause the previously stored input data to be read from the page 230-2 to the cache register 210. Accordingly, the processing device determines that the input data-1 (202) and the input data-2 (602) are already stored on the page 230-2, and causes (e.g., by issuing a request to) the memory device 200 to read each of the input data-1 (202) and the input data-2 (602) from locations 312 and 1020 on the page 230-2 to locations 1012 and 1014 on the cache register 210, respectively. At operation 1006, the input data-1 (202) and the input data-2 (602) are read from the page 230-2 to the cache register 210.

Thereafter, based on referencing the log data previously generated, the processing device can determine where the issuing of input data stopped (e.g., interrupted or paused), and knows where new input data will be stored on the cache register 210 to avoid altering or overwriting previously issued input data (e.g., the input data-1 (202) and the input data-2 (602)). Accordingly, based on the log data and based on the input data-1 (202) and the input data-2 (602) already being stored on the cache register 210 (at locations 1012 and 1014), the processing device causes the input data-3 (1002) to be stored at a location 1016 (e.g., offset byte location 8191) in the cache register 210, and the input data-4 (1004) to be stored at a location 1018 (e.g., offset byte location 8191) in the cache register 210. Subsequently, the processing device can cause data content of the cache register 210 (e.g., the input data-1, the input data-2, the input data-3, the input data-4) to be stored to a final destination page, where the final destination page comprises a page different from the page used to (temporarily) store input data while servicing a high priority read request.

FIGS. 11 through 14 are flow diagrams of example methods for servicing a high priority read request by a memory device, in accordance with some embodiments of the present disclosure. The methods 1100, 1200, 1300, 1400 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, at least one of the methods 1100, 1200, 1300, 1400 is performed by the memory sub-system controller 115 of FIG. 1 based on the high priority read request servicer 113. Additionally, or alternatively, for some embodiments, at least one of the methods 1100, 1200, 1300, 1400 is performed, at least in part, by the local media controller 135 of the memory device 130 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are used in every embodiment. Other process flows are possible.

Referring now to the method 1100 of FIG. 11, at operation 1102, while issuing a series of data units of data input to a cache register (e.g., 210) of a memory device (e.g., 200) for writing to the memory device, a processing device (e.g., the processor 117 of the memory sub-system controller 115) periodically determines whether at least one high priority read request exists for the memory device. For some embodiments, the cache register is associated with a plane of the memory device (e.g., NAND-type memory device), where the plane comprises a plurality of blocks (e.g., one or more SLC blocks) and where each block comprises a plurality of page (e.g., pages of a SLC block).

In response to determining that a high priority read request (e.g., 302) for a first page (e.g., 430) of the memory device exists, the processing device (e.g., the processor 117) stops (e.g., interrupts or pauses) the issuing the series of data units (by operation 1102) at operation 1104. For some embodiments, the first high priority read request specifies a page address associated with the first page, a block address associated with a block that comprises the first page, a logic unit (LUN) address associated with a logic unit that comprises the block, or some combination thereof.

At operation 1106, the processing device (e.g., the processor 117) causes a first set of data units, currently stored on the cache register (e.g., 210), to be stored to a second page (e.g., 230-2) of the memory device (e.g., 200). For some embodiments, the second page is part of a SLC block of the memory device. For instance, the SLC block can be part of a plane of the memory device, and causing the first set of data units to be stored to the second page can comprise SLC programming the second page with the first set of data units. As noted herein, a page of a SLC block can be written to (e.g., programmed) more than once between erase operations.

At operation 1108, the processing device (e.g., the processor 117) generates log data for the high priority read request that identifies where the issuing (the series of data units to the cache register) stopped at operation 1104. For some embodiments, the log data describes an occurrence of the high priority read request, identifies a data location (e.g., byte location) in the series of data units where the issuing the series of data units stopped, identifies (e.g., by block address and page address, such as with respect to a given plane) the second page where the first set of data units is stored, or some combination thereof. Depending on the embodiment, the log data can be stored on a memory (e.g., the local memory 119) coupled to the processing device.

At operation 1110, the processing device (e.g., the processor 117) services the high priority read request by the cache register (e.g., 210). For some embodiments, operation 1110 comprises causing a requested set of data units to be read from the first page (specified by the high priority read request) to the cache register, and reading the requested set of data units from the cache register.

After completion of the servicing the high priority read request (by operation 1110), the processing device (e.g., the processor 117) resumes, at operation 1112, based on the log data (generated by operation 1108), the issuing the series of data units to the cache register for writing to the memory device (resumes from data location identified by the log data). For some embodiments, operation 1112 causes the cache register to clear (e.g., clear all bytes from the cache register to ensure no prior data remains in the cache register) and issue one or more remaining data units, of the series of data units, to the cache register based on the data location identified by the log data.

After completion of the issuing the one or more remaining data units to the cache register (at operation 1112), at operation 1114, the processing device (e.g., the processor 117) causes a second set of data units, currently stored on the cache register, to be stored to the second page.

Figure 12A:
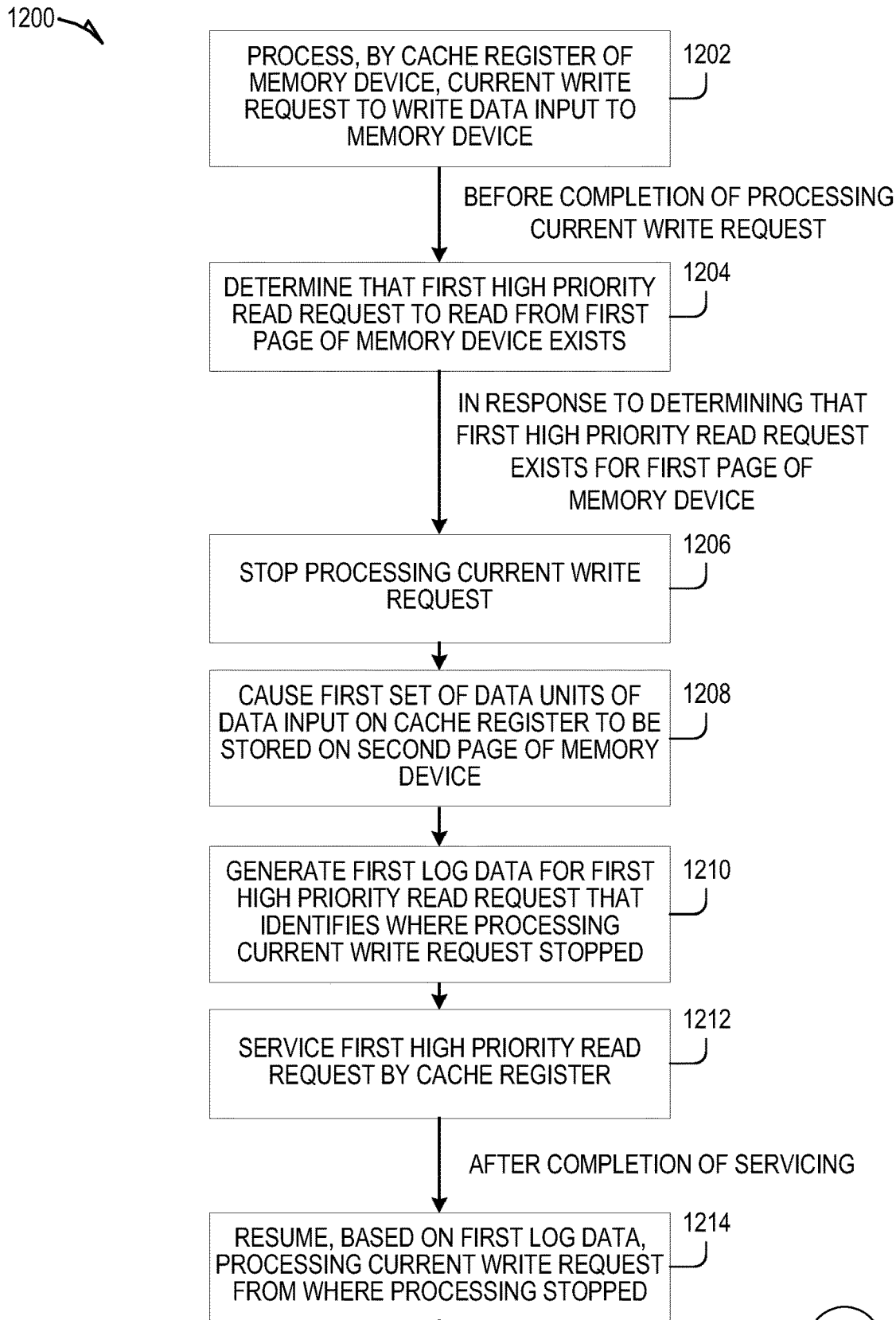
Figure 12B:
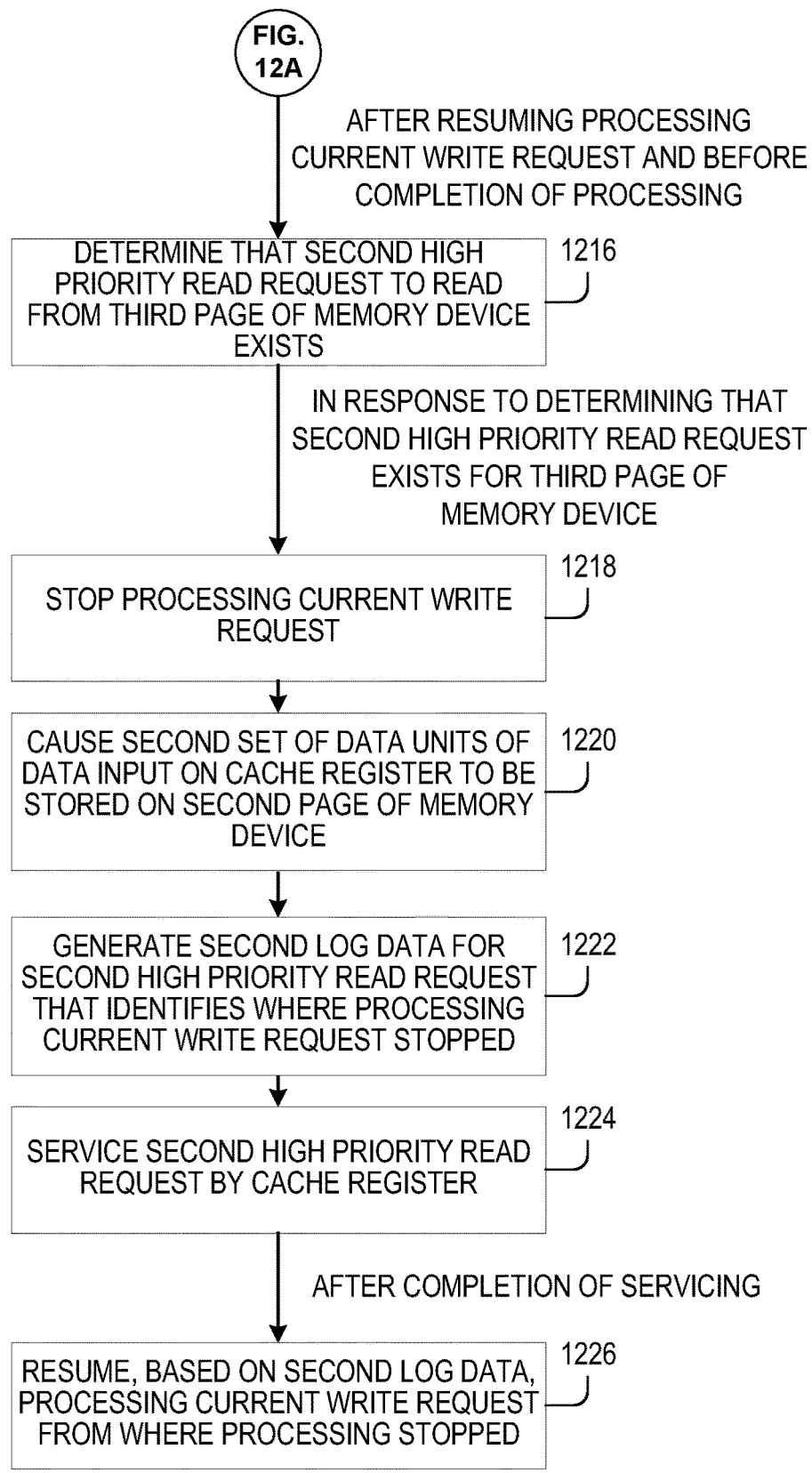

Referring now to the method 1200 of FIG. 12A and FIG. 12B, at operation 1202, a processing device (e.g., the processor 117 of the memory sub-system controller 115) processes, by a cache register (e.g., 210) of a memory device (e.g., 200), a current write request to write data input to the memory device, where the data input comprises a series of data units. For some embodiments, the cache register is associated with a plane (e.g., of NAND-type memory die) of the memory device (e.g., NAND-type memory device), where the plane comprises a plurality of blocks (e.g., one or more SLC blocks) and where each block comprises a plurality of page (e.g., pages of a SLC block). For some embodiments, operation 1202 comprises issuing (e.g., sending or inputting) each unit of the series of data units to the cache register; and after the series of data units is stored on the cache register, causing data content of the cache register to be stored on a single page of the individual memory device.

Before completion of the processing the current write request (by operation 1202), the processing device (e.g., the processor 117) determines, at operation 1204, that a first high priority read request, to read from a first page of the memory device, exists. For some embodiments, the first page being requested by the first high priority read request is from (a block of) a plane associated with the cache register being used for the current write request.

In response to determining that the first high priority read request exists, at operation 1206, the processing device (e.g., the processor 117) stops (e.g., interrupts or pauses) the processing the current write request (at operation 1202).

At operation 1208, the processing device (e.g., the processor 117) causes a first set of data units (of data input), currently stored on the cache register (e.g., 210), to be stored to a second page (e.g., 230-2) of the memory device (e.g., 200). For some embodiments, the processing device determines that causing the first set of data units to be stored to the second page fails to be successful and, in response to determining it was not successful (e.g., failed), the processing device causes the first set of data units to be stored to another page of another block (e.g., another SLC block). Additionally, for some embodiments, the memory device comprises a NAND-type memory device, where the second page is part of a single SLC block of the memory device. For such embodiments, the causing the first set of data units to be stored to the second page of the memory device can comprise causing SLC programming of the second page with the first set of data units. As described herein, using SLC programming permits the second page to be written to (e.g., programmed) more than once between erase operations (e.g., based on NOP feature of SLC programming).

At operation 1210. the processing device (e.g., the processor 117) generates first log data for the first high priority read request that identifies where the processing the current write request stopped at operation 1206. For some embodiments, the first log data describes an occurrence of the first high priority read request, identifies a data location (e.g., byte location) in the series of data units where the processing the current write request stopped, identifies (e.g., by block address and page address, such as with respect to a given plane) the second page where the first set of data units is stored, or some combination thereof. Depending on the embodiment, the first log data (and the like) can be stored on a memory (e.g., the local memory 119) coupled to the processing device.

At operation 1212, the processing device (e.g., the processor 117) services the first high priority read request by the cache register (e.g., 210). For some embodiments, operation 1212 comprises causing a requested set of data units to be read from the first page (specified by the first high priority read request) to the cache register, and reading the requested set of data units from the cache register. Once the requested set of data units are read from the cache register, the processing device can use or provide the requested set of data units as a part of a response (e.g., to the host system 120) to the entity that caused the first high priority read request (e.g., the host system 120).

After completion of the servicing the first high priority read request (by operation 1212), at operation 1214, the processing device (e.g., the processor 117) resumes, based on the first log data (generated by operation 1210), the processing the current write request from the first data location in the series of data units (as identified by the first log data).

After resuming the processing the current write request from the first data location in the series of data units (by operation 1214) and before completion of the processing the current write request, at operation 1216, the processing device (e.g., the processor 117) determines that a second high priority read request, to read from a third page of the memory device, exists. Like with the second page and the first high priority read request, the third page being requested by the second high priority read request can be from (a block of) a plane associated with the cache register being used for the current write request.

In response to determining that the second high priority read request exists, operations 1218 through 1226 are performed with respect to the second high priority read request, which are respectively similar to operations 1206 through 1214 performed with respect to the first high priority read request. In particular, at operation 1218, the processing device (e.g., the processor 117) stops the processing the current write request after it was resumed by operation 1214. At operation 1220, the processing device (e.g., the processor 117) causes a second set of data units (of data input), currently stored on the cache register (e.g., 210), to be stored to the second page (e.g., 230-2) of the memory device (e.g., 200). In particular, the second set of data units can be stored to the second page such that the second set of data units follow data units previously stored on the second page. For some embodiments, this is facilitated by SLC programming the second page with the second set of data units, which can avoid an erase operation prior to storing the second set of data units on the second page.

At operation 1222, the processing device (e.g., the processor 117) generates second log data for the second high priority read request that identifies where the processing the current write request stopped at operation 1218. For some embodiments, the second log data describes an occurrence of the second high priority read request, identifies a second data location in the series of data units where the processing the current write request stopped (after operation 1214), identifies the second page where the second set of data units is stored, or some combination thereof.

At operation 1224, the processing device (e.g., the processor 117) services the second high priority read request by the cache register (e.g., 210). For some embodiments, operation 1224 comprises causing a second requested set of data units to be read from the third page (specified by the second high priority read request) to the cache register, and reading the second requested set of data units from the cache register.

After completion of the servicing the second high priority read request (by operation 1224), the processing device (e.g., the processor 117), at operation 1226, based on the second log data (generated by operation 1222), resumes the processing the current write request from the second data location in the series of data units (as identified by the second log data).

Figure 13:
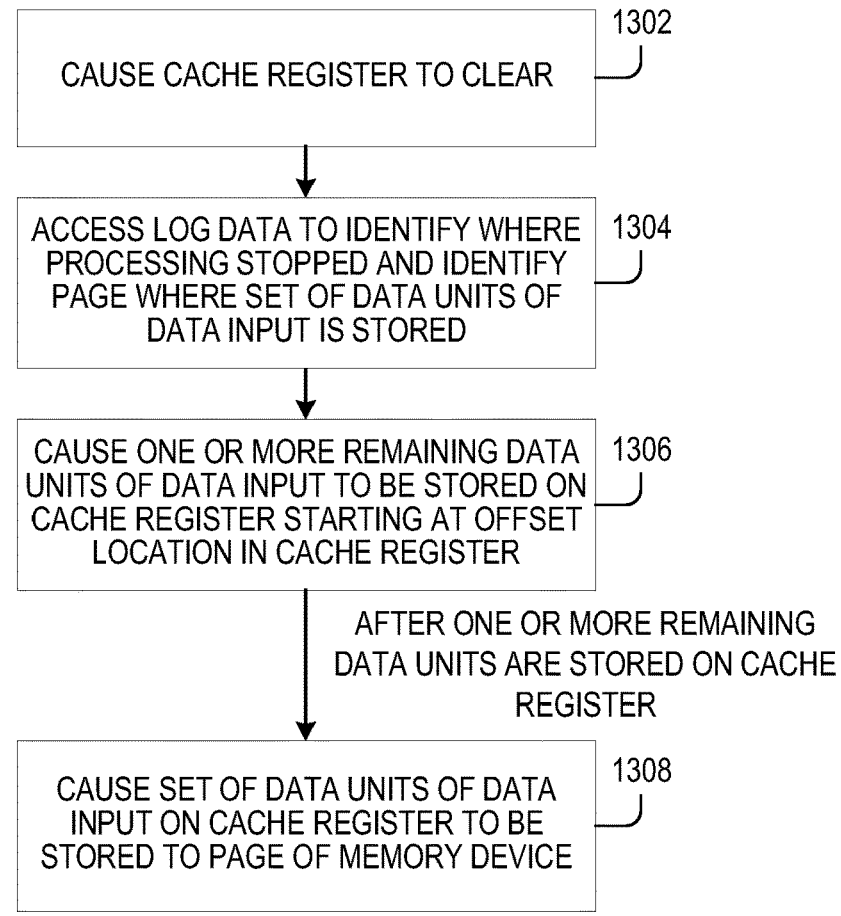

Referring now to the method 1300 of FIG. 13, the method 1300 illustrates an example of how some embodiments resume (e.g., by operations 1214 and 1226 of the method 1200) processing of a write request after servicing a high priority read request. For example, the method 1300 can be used with respect to a memory device that is configured to operate with SLC caching. At operation 1302, a processing device (e.g., the processor 117 of the memory sub-system controller 115) causes a cache register to clear.

At operation 1304, the processing device (e.g., the processor 117) accesses the log data (for a latest occurrence of a high priority read request) to identify where the processing the write request (e.g., current write request of the method 1200) stopped and identify a page (e.g., the second page of the method 1200) of the memory device where a set of data units of data input (e.g., the first and second sets of data units of the method 1200) was stored while the high priority read request was being serviced (prior to resuming the processing by the method 1300). In particular, the log data can be a data location where the processing the write request stopped and where the processing can resume after the high priority read request is serviced.

At operation 1306, the processing device (e.g., the processor 117) causes one or more remaining data units, from the series of data units of data input, to be stored on (e.g., inputted to) the cache register starting at an offset location in the cache register. For some embodiments, the offset location is determined based on where the processing stopped as identified by the log data accessed by operation 1304. For example, the one or more remaining data units can start at the data location in the series of data units where the processing the write request stopped, and the offset location can be determined based on the data location.

After the one or more remaining data units are stored on the cache register (at operation 1306), the processing device (e.g., the processor 117), at operation 1308, causes a set of data units of the data input, currently stored on the cache register, to be stored on the page (identified by the log data accessed by operation 1304). For instance, causing the set of data units to be stored to the page can comprise SLC programming the page with the set of data units.

Figure 14:
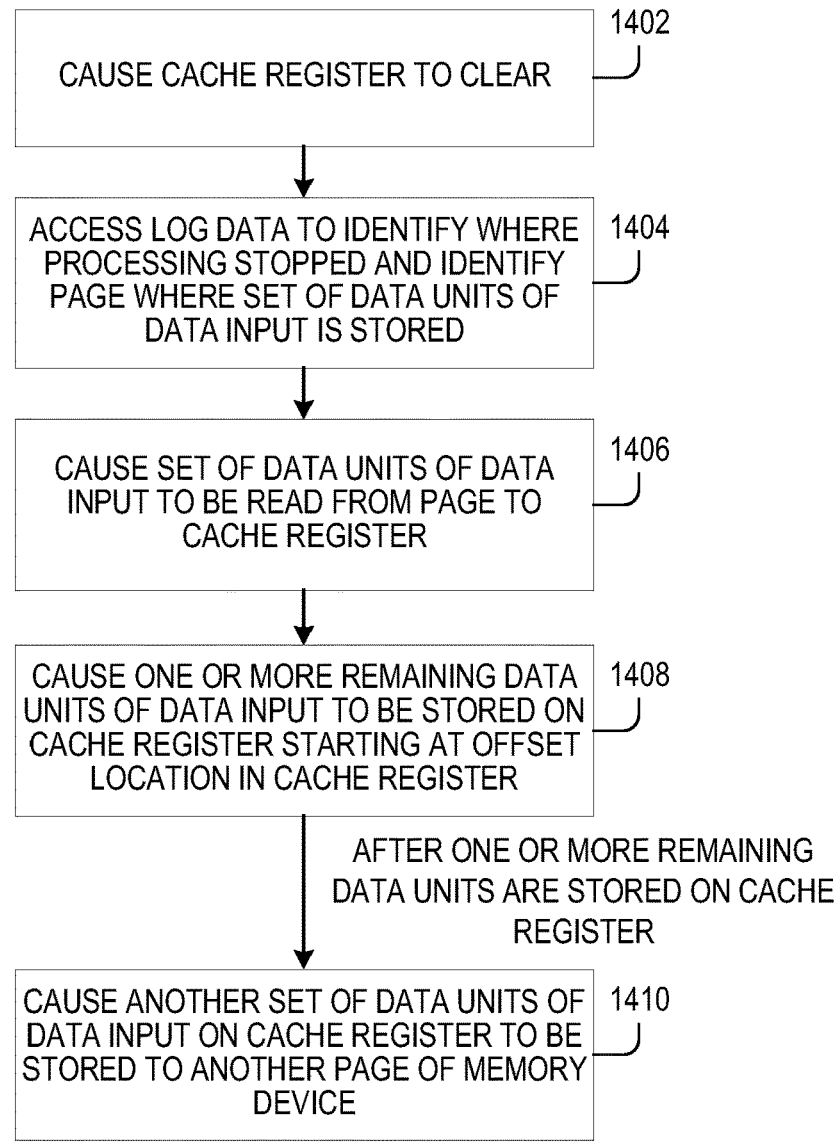

Referring now to the method 1400 of FIG. 14, at operation 1402, the method 1400 illustrates another example of how some embodiments resume (e.g., by operations 1214 and 1226 of the method 1200) processing of a write request after servicing a high priority read request. For example, the method 1400 can be used with respect to a memory device that is not configured to operate with SLC caching. For various embodiments, operations 1402 and 1404 are respectively similar to operations 1302 and 1304 of the method 1300 as described with respect to FIG. 13.

At operation 1406, a processing device (e.g., the processor 117 of the memory sub-system controller 115) causes a set of data units of the data input (e.g., previously stored by operation 1208 or 1220 to the page identified by the log data) to be read from the page to the cache register. For some embodiments, the set of data units of the data input to be read from the page to the cache register comprises issuing a SLC read to the page identified by the log data.

At operation 1408, the processing device (e.g., the processor 117) causes one or more remaining data units, from the series of data units of data input, to be stored on (e.g., inputted to) the cache register starting at an offset location in the cache register. For some embodiments, the offset location is determined based on where the processing stopped as identified by the log data accessed by operation 1404. For example, the one or more remaining data units can start at the data location in the series of data units where the processing the write request stopped, and the offset location can be determined based on the data location.

After the one or more remaining data units are stored on the cache register (at operation 1408), the processing device (e.g., the processor 117), at operation 1410, causes another set of data units of the data input, currently stored on the cache register, to be stored on another page (of the same plane that comprises the page identified by the log data) of the memory device. The other page used to store the other set of data units can represent a final destination for the data input. For some embodiments, as a result of operations 1406 and 1408, the other set of data units (stored on the other page) comprises the set of data units of operation 1406 and the one or more remaining data units of operation 1408. For various embodiments, the page used by operation 1406 is part of a SLC block of the memory device (e.g., one reserved for temporarily storing data from the cache register when servicing a high priority read request), while the other page used by the operation 1408 is part of a non-SLC block of the memory device. Accordingly, causing the other set of data units to be stored on the other page comprises causing non-SLC programming of the other page with the other set of data units. For instance, where the non-SLC block is a TLC block, causing the other set of data units to be stored on the other page comprises causing TLC programming of the other page with the other set of data units.

Figure 15A:
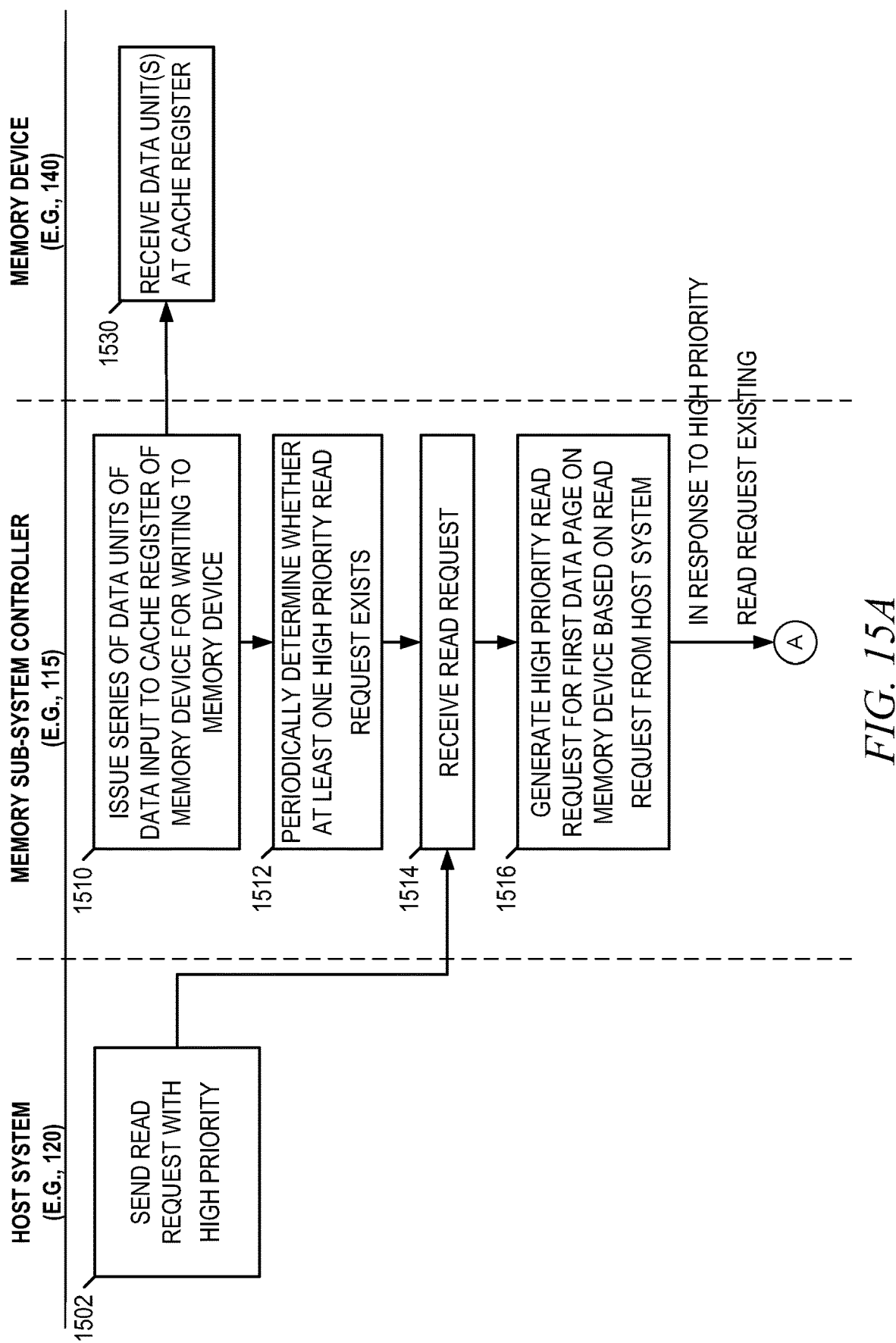
FIGS. 15A through 15C provide an interaction diagram illustrating interactions between components of a computing environment in the context of some embodiments in which a method for servicing a high priority read request by a memory device as described herein is performed.
Figure 15B:
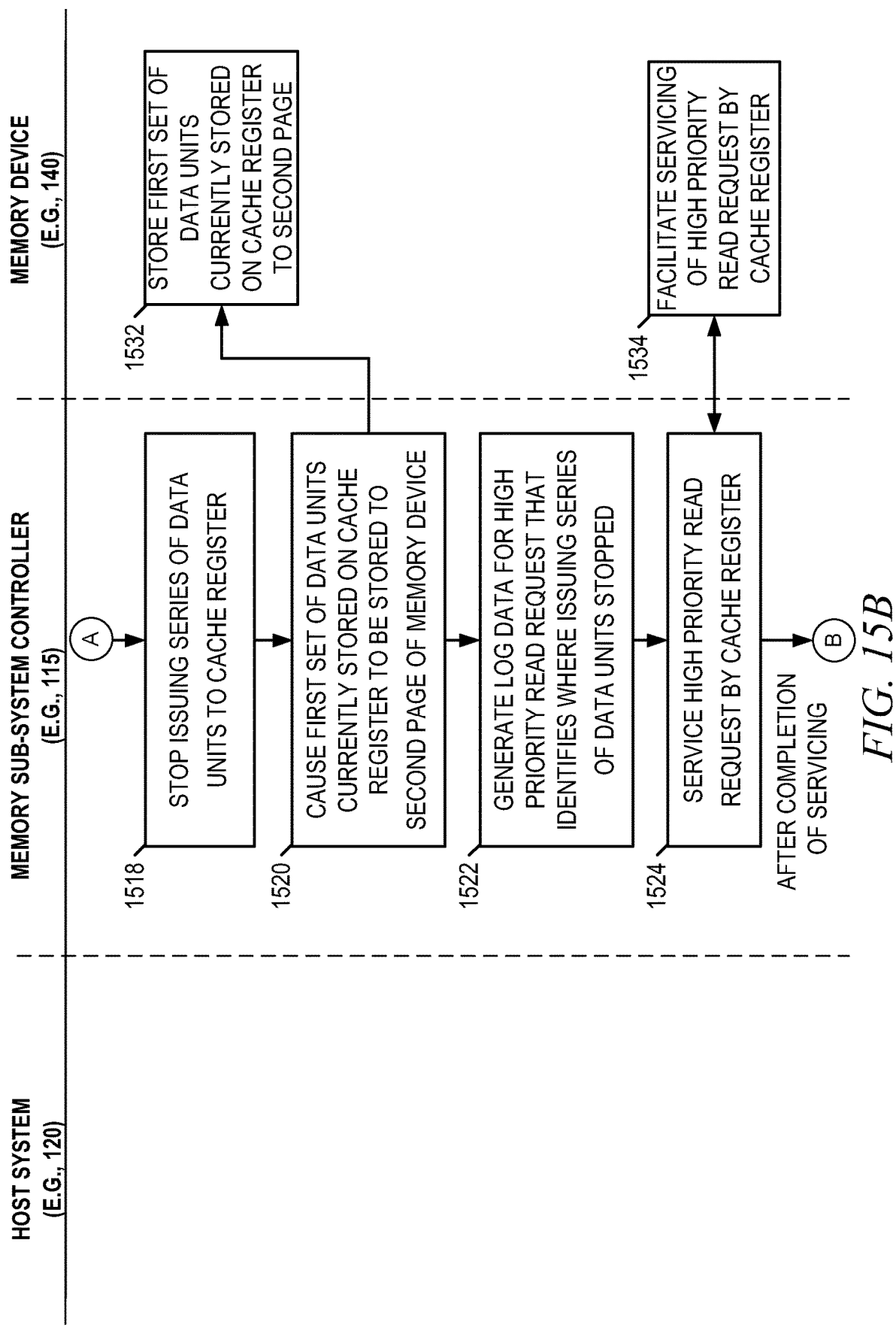
Figure 15C:
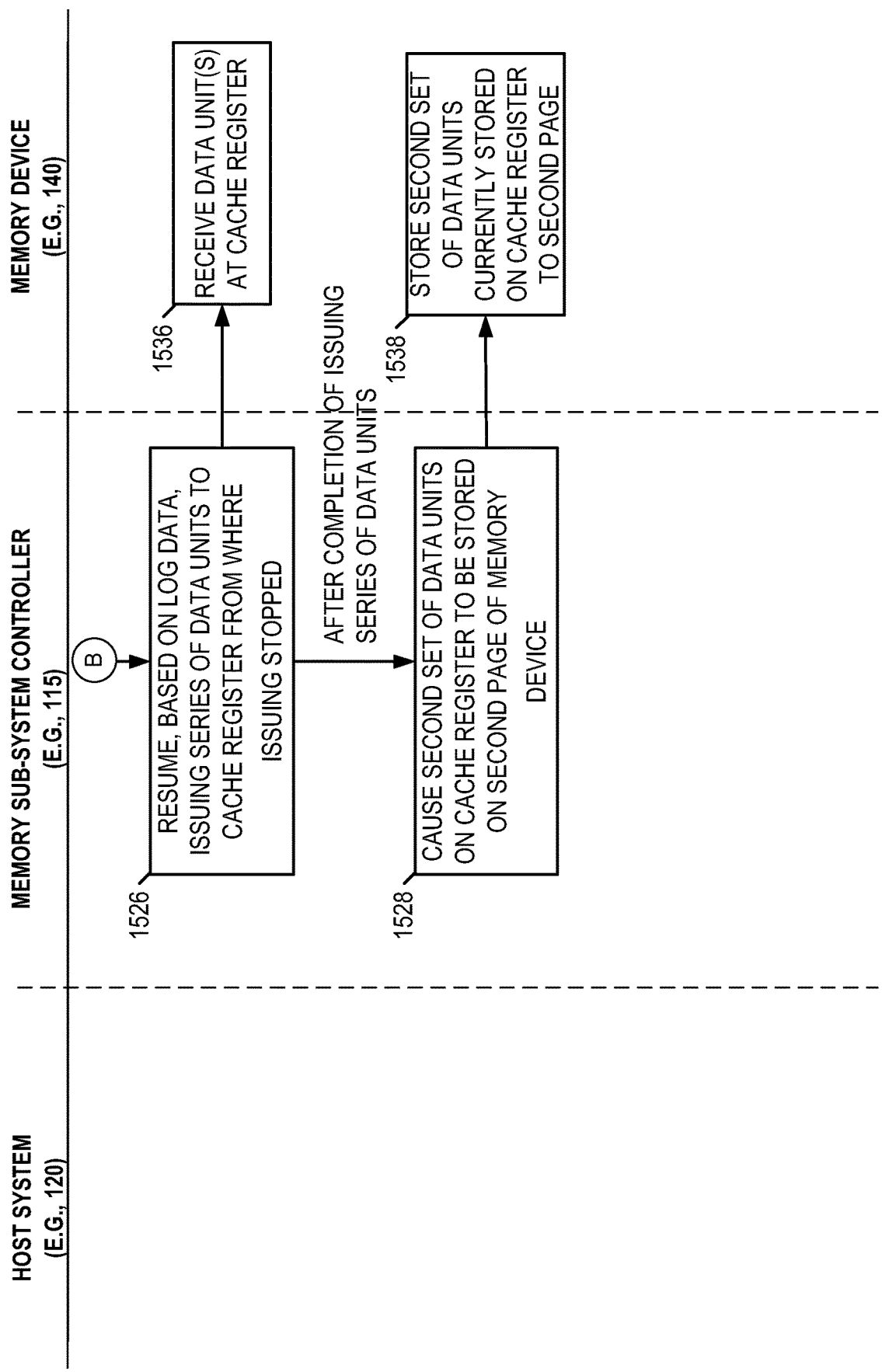

FIGS. 15A through 15C provide an interaction diagram illustrating interactions between components of a computing environment in the context of some embodiments in which a method for servicing a high priority read request by a memory device as described herein is performed. The operations of the method can be performed by processing logic that can include hardware (e.g., a processing device, circuitry, dedicated logic, programmable logic, microcode, hardware of a device, an integrated circuit, etc.), software (e.g., instructions run or executed on a processing device), or a combination thereof. In some embodiments, the method is performed by a host system (e.g., 120), a memory sub-system controller (e.g., 115), a memory device (e.g., 120 or 130), or some combination thereof. Although the operations are shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are used in every embodiment. In the context of the example illustrated in FIGS. 15A through 15C, the host system can include the host system 120, the memory sub-system controller can include the memory sub-system controller 115, and the memory device can include the memory device 140.

As shown in FIG. 15A, at operation 1510, the memory sub-system controller 115 issues a series of data units of data input to a cache register of the memory device 140 for writing to the memory device 140. For various embodiments, the cache register is associated with an individual plane of a NAND-type die, where the individual plane comprises a plurality of blocks, each block comprises a plurality of pages, and at least one block of the plurality of blocks is a SLC block. At operation 1530, the memory device 140 receives one or more data units at the cache register based on operation 1510. At operation 1512, while operation 1510 is being performed, the memory sub-system controller 115 periodically determines whether at least one high priority read request exists.

At operation 1502, the host system 120 sends a read request to the memory sub-system 110. At operation 1514, the memory sub-system controller 115 receives the read request from the host system 120. In response to the read request from the host system 120, at operation 1516, the memory sub-system controller 115 generates a high priority read request for a first data page on the memory device 140 based on the read request from the host system 120.

Referring to FIG. 15B, in response to the high priority read request existing (based on generation by operation 1516), operation 1518 is performed. At operation 1518, the memory sub-system controller 115 stops (e.g., interrupts or pauses) issuing the series of data units to the cache register. At operation 1520, the memory sub-system controller 115 causes a first set of data units, currently stored on the cache register (e.g., 210), to be stored to a second page (e.g., 230-2) of the memory device (e.g., 200). In response to operation 1520, at operation 1532, the memory device 140 stores the first set of data units currently stored on the cache register to the second page.

At operation 1522, the memory sub-system controller 115 generates log data for the high priority read request that identifies where the issuing (the series of data units to the cache register) stopped at operation 1518. At operation 1524, the memory sub-system controller 115 services the high priority read request by (e.g., using) the cache register of the memory device 140 as described herein. In response to operation 1524, at operation 1534, the memory device 140 facilitates servicing the high priority read request by (e.g., using) the cache register of the memory device 140.

Referring to FIG. 15C, after completion of operation 1524, operation 1526 is performed. At operation 1526, the memory sub-system controller 115 resumes, based on the log data (generated by operation 1522), the issuing the series of data units to the cache register for writing to the memory device 140 (resumes from data location identified by the log data). At operation 1536, the memory device 140 receives one or more (remaining) data units at the cache register based on operation 1526. After completion of issuing the series of data units to the cache register, at operation 1528, the memory sub-system controller 115 causes a second set of data units, currently stored on the cache register, to be stored to the second page. In response to operation 1528, at operation 1538, the memory device 140 stores the second set of data units currently stored on the cache register to the second page.

Figure 16:
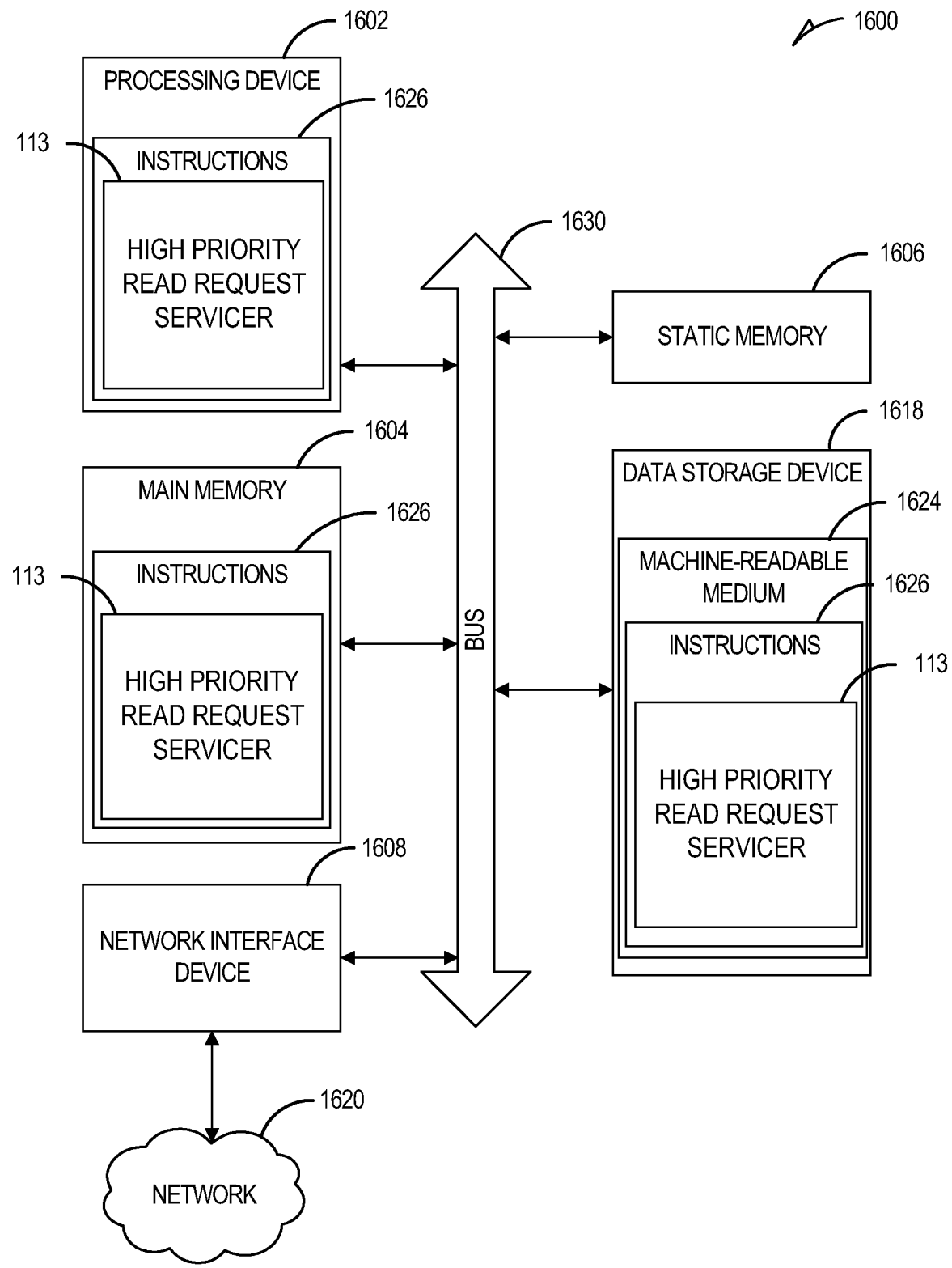
FIG. 16 is a block diagram of an example computer system in which embodiments of the present disclosure may operate.

FIG. 16 illustrates an example machine in the form of a computer system 1600 within which a set of instructions can be executed for causing the machine to perform any one or more of the methodologies discussed herein. In some embodiments, the computer system 1600 can correspond to a host system (e.g., the host system 120 of FIG. 1) that includes, is coupled to, or utilizes a memory sub-system (e.g., the memory sub-system 110 of FIG. 1) or can be used to perform the operations described herein. In alternative embodiments, the machine can be connected (e.g., networked) to other machines in a local area network (LAN), an intranet, an extranet, and/or the Internet. The machine can operate in the capacity of a server or a client machine in a client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 1600 includes a processing device 1602, a main memory 1604 (e.g., read-only memory (ROM), flash memory, dynamic random access memory (DRAM) such as synchronous DRAM (SDRAM) or Rambus DRAM (RDRAM), etc.), a static memory 1606 (e.g., flash memory, static random access memory (SRAM), etc.), and a data storage device 1618, which communicate with each other via a bus 1630.

The processing device 1602 represents one or more general-purpose processing devices such as a microprocessor, a central processing unit, or the like. More particularly, the processing device 1602 can be a complex instruction set computing (CISC) microprocessor, a reduced instruction set computing (RISC) microprocessor, a very long instruction word (VLIW) microprocessor, a processor implementing other instruction sets, or processors implementing a combination of instruction sets. The processing device 1602 can also be one or more special-purpose processing devices such as an application specific integrated circuit (ASIC), a field programmable gate array (FPGA), a digital signal processor (DSP), a network processor, or the like. The processing device 1602 is configured to execute instructions 1626 for performing the operations and steps discussed herein. The computer system 1600 can further include a network interface device 1608 to communicate over a network 1620.

The data storage device 1618 can include a machine-readable storage medium 1624 (also known as a computer-readable medium) on which is stored one or more sets of instructions 1626 or software embodying any one or more of the methodologies or functions described herein. The instructions 1626 can also reside, completely or at least partially, within the main memory 1604 and/or within the processing device 1602 during execution thereof by the computer system 1600, the main memory 1604 and the processing device 1602 also constituting machine-readable storage media. The machine-readable storage medium 1624, data storage device 1618, and/or main memory 1604 can correspond to the memory sub-system 110 of FIG. 1.

In one embodiment, the instructions 1626 include instructions to implement functionality corresponding to servicing a high priority read request by a memory device as described herein (e.g., the high priority read request servicer 113 of FIG. 1). While the machine-readable storage medium 1624 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer-readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A system comprising:
    a set of memory devices comprising an individual memory device; and
    a processing device, operatively coupled to the set of memory devices, configured to perform operations comprising:
        processing, by a cache register of the individual memory device, a current write request to write data input to the individual memory device, the data input comprising a series of data units;
        before completion of the processing the current write request, determining that a first high priority read request, to read from a first page of the individual memory device, exists; and
        in response to determining that the first high priority read request exists:
            stopping the processing the current write request;
            causing a first set of data units of the data input, currently stored on the cache register, to be stored to a second page of the individual memory device;
            generating first log data that describes an occurrence of the first high priority read request, identifies a first data location in the series of data units where the processing the current write request stopped, and identifies the second page where the first set of data units is stored;
            servicing the first high priority read request by the cache register; and
            after completion of the servicing the first high priority read request, resuming, based on the first log data, the processing the current write request from the first data location in the series of data units.

2. The system of claim 1, wherein the servicing the first high priority read request by the cache register comprises:
    causing a requested set of data units to be read from the first page to the cache register; and
    reading the requested set of data units from the cache register.

3. The system of claim 1, wherein the individual memory device comprises a NAND-type memory device, the second page is part of a single level cell (SLC) block of the individual memory device, and the causing the first set of data units to be stored to the second page of the individual memory device comprises:
    causing single level cell (SLC) programming of the second page with the first set of data units.

4. The system of claim 1, wherein the resuming, based on the first log data, the processing the current write request from the first data location in the series of data units comprises:
    causing the cache register to clear;
    accessing the first log data to identify the first data location and to identify the second page; and
    causing one or more remaining data units, from the series of data units, to be stored on the cache register starting at an offset location in the cache register, the one or more remaining data units starting at the first data location in the series of data units where the processing the current write request stopped, and the offset location being determined based on the first data location.

5. The system of claim 4, wherein the resuming, based on the first log data, the processing the current write request from the first data location in the series of data units further comprises:

after the one or more remaining data units are stored on the cache register starting at the offset location in the cache register, causing a second set of data units of the data input, currently stored on the cache register, to be stored to the second page.

6. The system of claim 4, wherein the individual memory device comprises a NAND-type memory device, the second page is part of a single level cell (SLC) block of the individual memory device, and the causing the second set of data units of the data input to be stored to the second page comprises:
  causing single level cell (SLC) programming of the second page with the second set of data units.

7. The system of claim 6, wherein the NAND-type memory device is configured to operate with SLC caching.

8. The system of claim 1, wherein the resuming, based on the first log data, the processing the current write request from the first data location in the series of data units comprises:
  causing the cache register to clear;
  accessing the first log data to identify the first data location and to identify the second page;
  causing a second set of data units of the data input to be read from the second page to the cache register; and
  causing one or more remaining data units, from the series of data units, to be stored on the cache register starting at an offset location in the cache register, the one or more remaining data units starting at the first data location in the series of data units where the processing the current write request stopped, and the offset location being determined based on the first data location.

9. The system of claim 8, wherein the resuming, based on the first log data, the processing the current write request from the first data location in the series of data units further comprises:
  after the one or more remaining data units are stored on the cache register starting at the offset location in the cache register, causing a third set of data units of the data input, currently stored on the cache register, to be stored to a third page of the individual memory device, the third set of data units comprising the second set of data units and the one or more remaining data units.

10. The system of claim 9, wherein the second page is part of a single level cell (SLC) block of the individual memory device, the third page is part of a non-SLC block of the individual memory device, and the causing the third set of data units of the data input to be stored to the third page of the individual memory device comprises:
  causing non-single level cell (SLC) programming of the third page with the third set of data units.

11. The system of claim 10, wherein the SLC block is reserved for temporarily storing data from the cache register.

12. The system of claim 8, wherein the causing the second set of data units of the data input to be read from the second page to the cache register comprises:
  issuing a single level cell (SLC) read to the second page.

13. The system of claim 1, wherein the processing, by the cache register, the current write request to write the data input to the individual memory device comprises:
  issuing each unit of the series of data units to the cache register; and
  after the series of data units is stored on the cache register, causing data content of the cache register to be stored on a single page of the individual memory device.

14. The system of claim 1, wherein the individual memory device comprises a NAND-type memory die, the cache register is associated with an individual plane of the NAND-type memory die, the first page is part of a first block of the individual plane, and the second page is part of a second block of the individual plane.

15. The system of claim 14, wherein the individual plane is part of an individual logic unit of the NAND-type memory die, and the first high priority read request specifies a page address of the first page, a block address of the first block, and a logic unit address of the individual logic unit.

16. The system of claim 1, wherein the operations further comprise:
  after the resuming, based on the first log data, the processing the current write request from the first data location in the series of data units:
    before completion of the processing the current write request, determining that a second high priority read request, to read from a third page of the individual memory device, exists; and
    in response to determining that the second high priority read request exists:
      stopping the processing the current write request;
      causing a second set of data units of the data input, currently stored on the cache register, to be stored to the second page;
      generating second log data that describes an occurrence of the second high priority read request, that identifies a second data location in the series of data units where the processing the current write request stopped, and that identifies the second page where the second set of data units is stored;
      servicing the second high priority read request by the cache register; and
      after completion of the servicing the second high priority read request, resuming, based on the second log data, the processing the current write request from the second data location in the series of data units.

17. The system of claim 1, wherein the processing device is part of a media controller.

18. The system of claim 1, wherein the system is a memory sub-system, and the processing device is part of a memory sub-system controller.

19. A method comprising:
  processing, by a cache register of a memory device, a current write request to write data input to a plane of a NAND-type memory device, the plane comprising a plurality of blocks, the cache register being associated with the plane, and the data input comprising a series of data units;
  before completion of the processing the current write request, determining that a first high priority read request, to read from a first page of a first block of the plurality of blocks, exists; and
  in response to determining that the first high priority read request exists:
    stopping the processing the current write request;
    causing a first set of data units of the data input, currently stored on the cache register, to be stored to a second page of a second block of the plurality of blocks, the second block being a single level cell (SLC) block;
    generating first log data that describes an occurrence of the first high priority read request, identifies a first data location in the series of data units where the processing the current write request stopped, and identifies the second page where the first set of data units is stored;

servicing the first high priority read request by the cache register; and after completion of the servicing the first high priority read request, resuming, based on the first log data, the processing the current write request from the first data location in the series of data units.

20. At least one non-transitory machine-readable storage medium comprising instructions that, when executed by a processing device, cause the processing device to perform operations comprising:

while issuing a series of data units of data input to a cache register of a memory device for writing to the memory device, periodically determining whether at least one high priority read request exists for the memory device; and in response to determining that a high priority read request for a first page of the memory device exists:
stopping the issuing the series of data units;
causing a first set of data units, currently stored on the cache register, to be stored to a second page of the memory device;
generating log data that describes an occurrence of the high priority read request, identifies a data location in the series of data units where the issuing the series of data units stopped, and identifies the second page where the first set of data units is stored;
servicing the high priority read request by the cache register; and
after completion of the servicing the high priority read request, resuming, based on the log data, the issuing the series of data units to the cache register for writing to the memory device by:
causing the cache register to clear; and
issuing one or more remaining data units, of the series of data units, to the cache register based on the data location identified by the log data; and
after completion of the issuing the one or more remaining data units to the cache register, causing a second set of data units, currently stored on the cache register, to be stored to the second page.

\* \* \* \* \*